United States Patent
Abhishek Raja

(10) Patent No.: US 12,423,223 B2
(45) Date of Patent: Sep. 23, 2025

(54) ACCESS REQUESTS TO LOCAL STORAGE CIRCUITRY

(71) Applicant: Arm Limited, Cambridge (GB)

(72) Inventor: Abhishek Raja, Niagara Falls, NY (US)

(73) Assignee: Arm Limited, Cambridge (GB)

( * ) Notice: Subject to any disclaimer, the term of this patent is extended or adjusted under 35 U.S.C. 154(b) by 75 days.

(21) Appl. No.: 18/477,625

(22) Filed: Sep. 29, 2023

(65) Prior Publication Data

US 2025/0110863 A1    Apr. 3, 2025

(51) Int. Cl.
G06F 12/00    (2006.01)
G06F 12/02    (2006.01)

(52) U.S. Cl.
CPC .................................. G06F 12/023 (2013.01)

(58) Field of Classification Search
CPC . G06F 12/023; G06F 12/0802; G06F 12/0862
See application file for complete search history.

(56) References Cited

U.S. PATENT DOCUMENTS

| | | | | |
|---|---|---|---|---|
| 2008/0270758 A1* | 10/2008 | Ozer | ................... | G06F 12/0897 711/E12.024 |
| 2014/0259161 A1* | 9/2014 | Kastner | ................. | G06F 21/556 726/22 |

* cited by examiner

Primary Examiner — Shawn X Gu
(74) Attorney, Agent, or Firm — NIXON & VANDERHYE P.C.

(57) ABSTRACT

There is provided an apparatus, system, chip-containing product, method, and storage medium. The apparatus comprises memory access circuitry responsive to one or more types of memory access request, to retrieve specified data items from memory. The apparatus is also provided with local storage circuitry configured to store at least some of the retrieved data items. The local storage circuitry is N-way associative, and N is greater than 1. The apparatus is also provided with control circuitry responsive to an indication that an access request signalled to the local storage circuitry relating to an accessed data item corresponds to a predefined type of memory access request, to implement a restrictive access policy in relation to the accessed data item in the local storage circuitry. The restrictive access policy excludes at least one step of accessing an excluded subset of ways of the local storage circuitry.

19 Claims, 14 Drawing Sheets

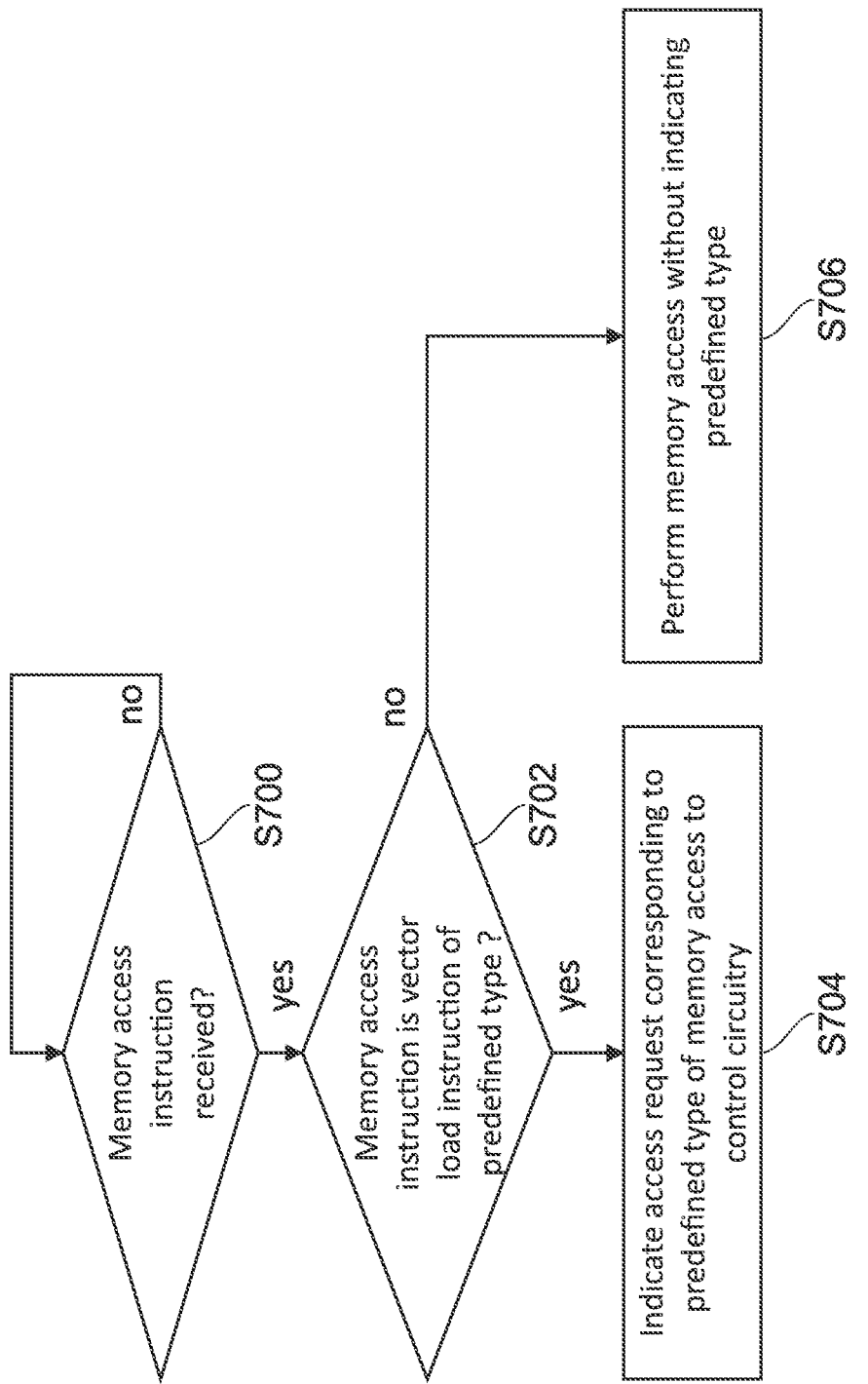

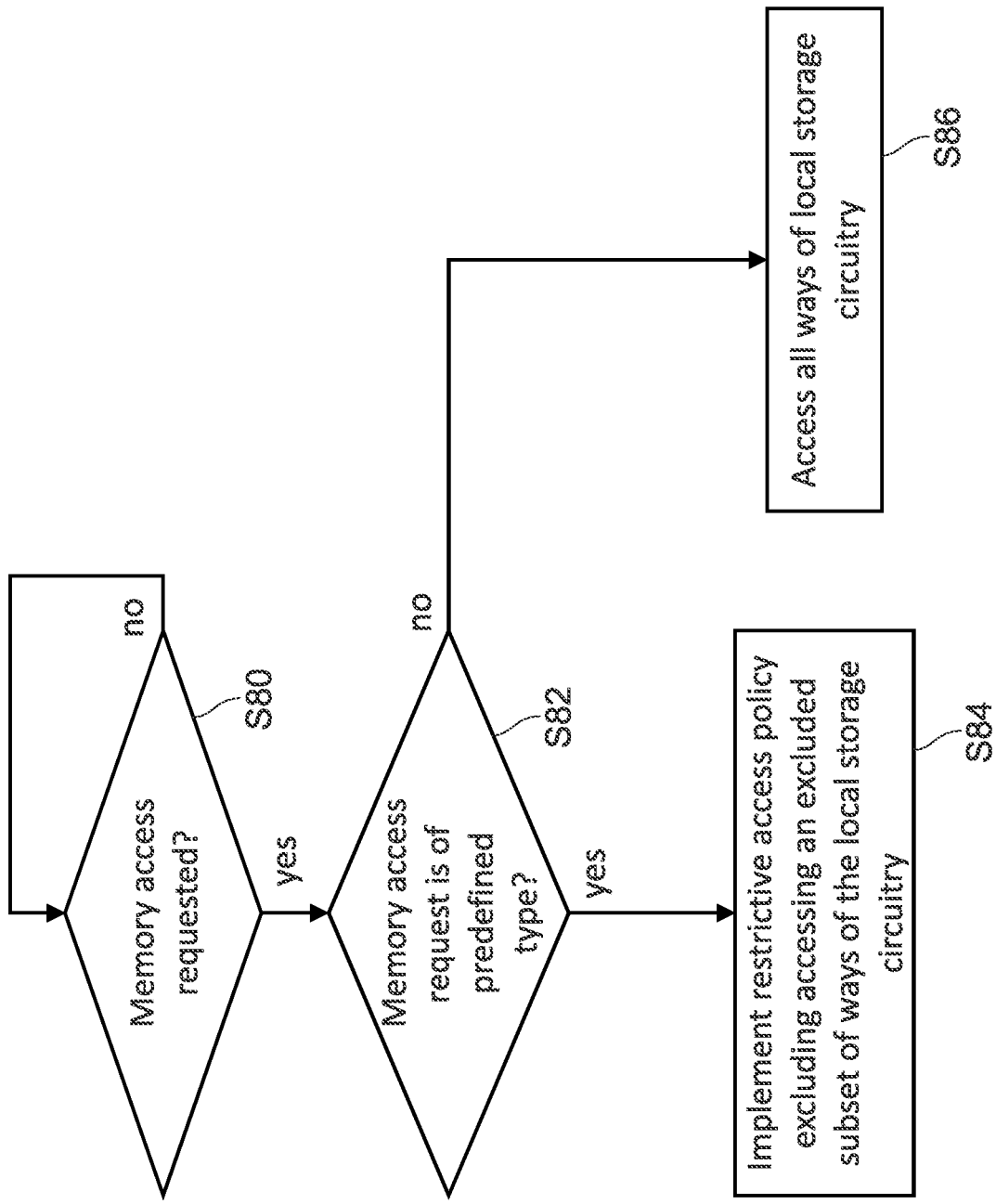

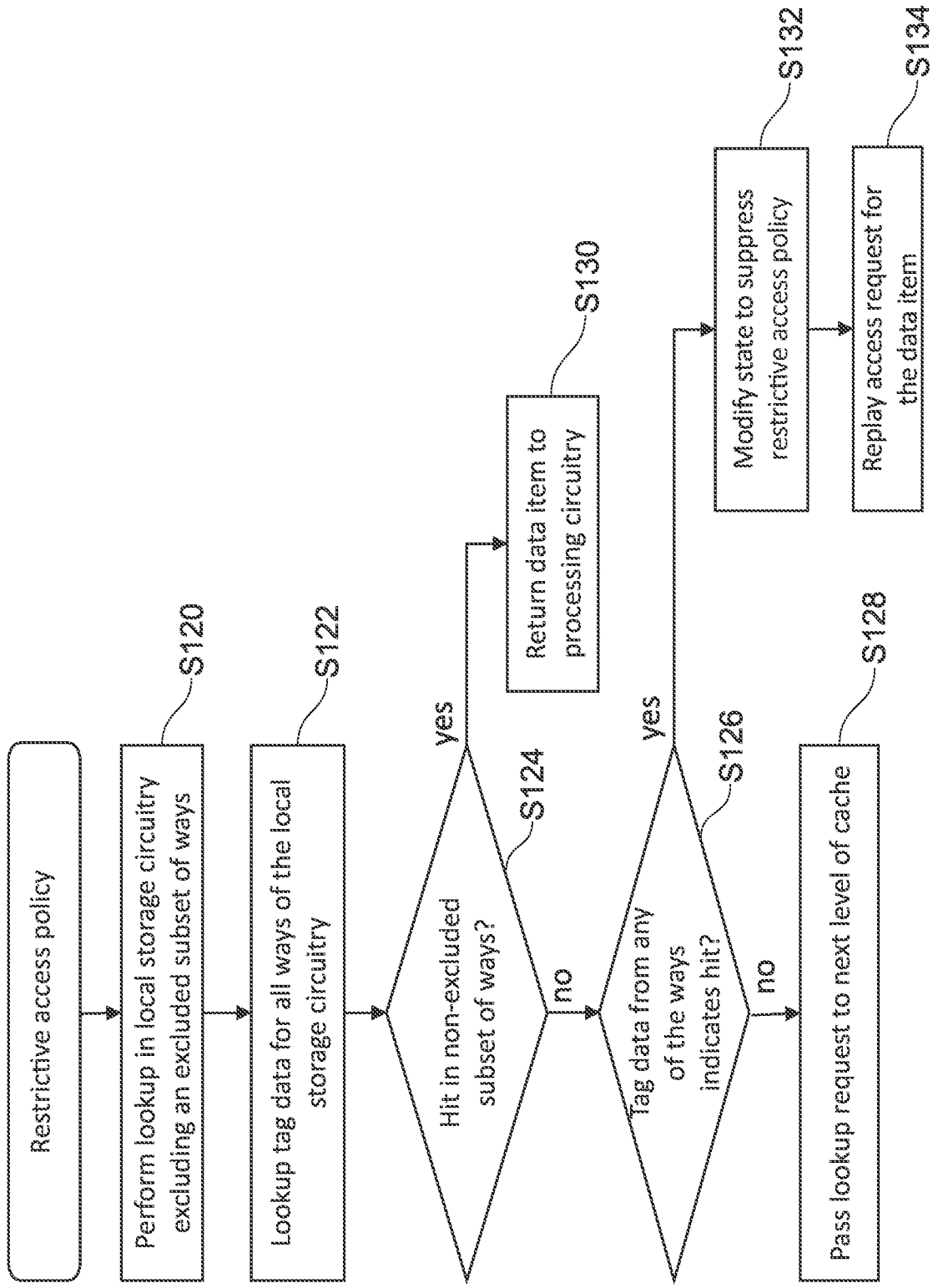

ACCESS REQUESTS TO LOCAL STORAGE CIRCUITRY

TECHNICAL FIELD

The present invention relates to data processing. More particularly the present invention relates to an apparatus, a system, a chip-containing product, a method, and a non-transitory computer readable storage medium.

BACKGROUND

Some data processing apparatuses are provided with local storage circuitry to store data items that are retrieved from memory. The local storage structure may be provided as an N-way associative storage structure which provides N ways in which the data items could potentially be stored.

SUMMARY

In a first example configuration there is provided an apparatus comprising:
memory access circuitry responsive to one or more types of memory access request, to retrieve data items specified in the one or more types of memory access request from memory;
local storage circuitry configured to store at least some of the retrieved data items, wherein the local storage circuitry is N-way associative, and N is greater than 1; and
control circuitry responsive to an indication that an access request signalled to the local storage circuitry relating to an accessed data item corresponds to a predefined type of memory access request, to implement a restrictive access policy in relation to the accessed data item in the local storage circuitry, wherein the restrictive access policy excludes at least one step of accessing an excluded subset of ways of the local storage circuitry.

In a second example configuration there is provided a system comprising:
the apparatus of the first example configuration, implemented in at least one packaged chip;
at least one system component; and
a board,
wherein the at least one packaged chip and the at least one system component are assembled on the board.

In a third example configuration there is provided a chip-containing product comprising the system of the second example configuration assembled on a further board with at least one other product component.

In a fourth example configuration there is provided a method of operating an apparatus, the method comprising:
in response to one or more types of memory access request, retrieving data items specified in the one or more types of memory access request from memory;
storing at least some of the retrieved data items in local storage circuitry, wherein the local storage circuitry is N-way associative, and N is greater than 1; and
in response to an indication that an access request signalled to the local storage circuitry relating to an accessed data item corresponds to a predefined type of memory access request, implementing a restrictive access policy in relation to the accessed data item in the local storage circuitry, wherein the restrictive access policy excludes at least one step of accessing an excluded subset of ways of the local storage circuitry.

In a further example configuration there is provided non-transitory computer readable storage medium to store computer-readable code for fabrication of an apparatus comprising:
memory access circuitry responsive to one or more types of memory access request, to retrieve data items specified in the one or more types of memory access request from memory;
local storage circuitry configured to store at least some of the retrieved data items, wherein the local storage circuitry is N-way associative, and N is greater than 1; and
control circuitry responsive to an indication that an access request signalled to the local storage circuitry relating to an accessed data item corresponds to a predefined type of memory access request, to implement a restrictive access policy in relation to the accessed data item in the local storage circuitry, wherein the restrictive access policy excludes at least one step of accessing an excluded subset of ways of the local storage circuitry.

BRIEF DESCRIPTION OF THE DRAWINGS

The present invention will be described further, by way of example only, with reference to configurations thereof as illustrated in the accompanying drawings, in which:

FIG. 7b schematically illustrates a sequence of steps carried out according to some configurations of the present techniques;

FIG. 8 schematically illustrates a sequence of steps carried out according to some configurations of the present techniques;

FIG. 9c schematically illustrates a sequence of steps carried out according to some configurations of the present techniques.

DESCRIPTION OF EXAMPLE CONFIGURATIONS

Figure 1:
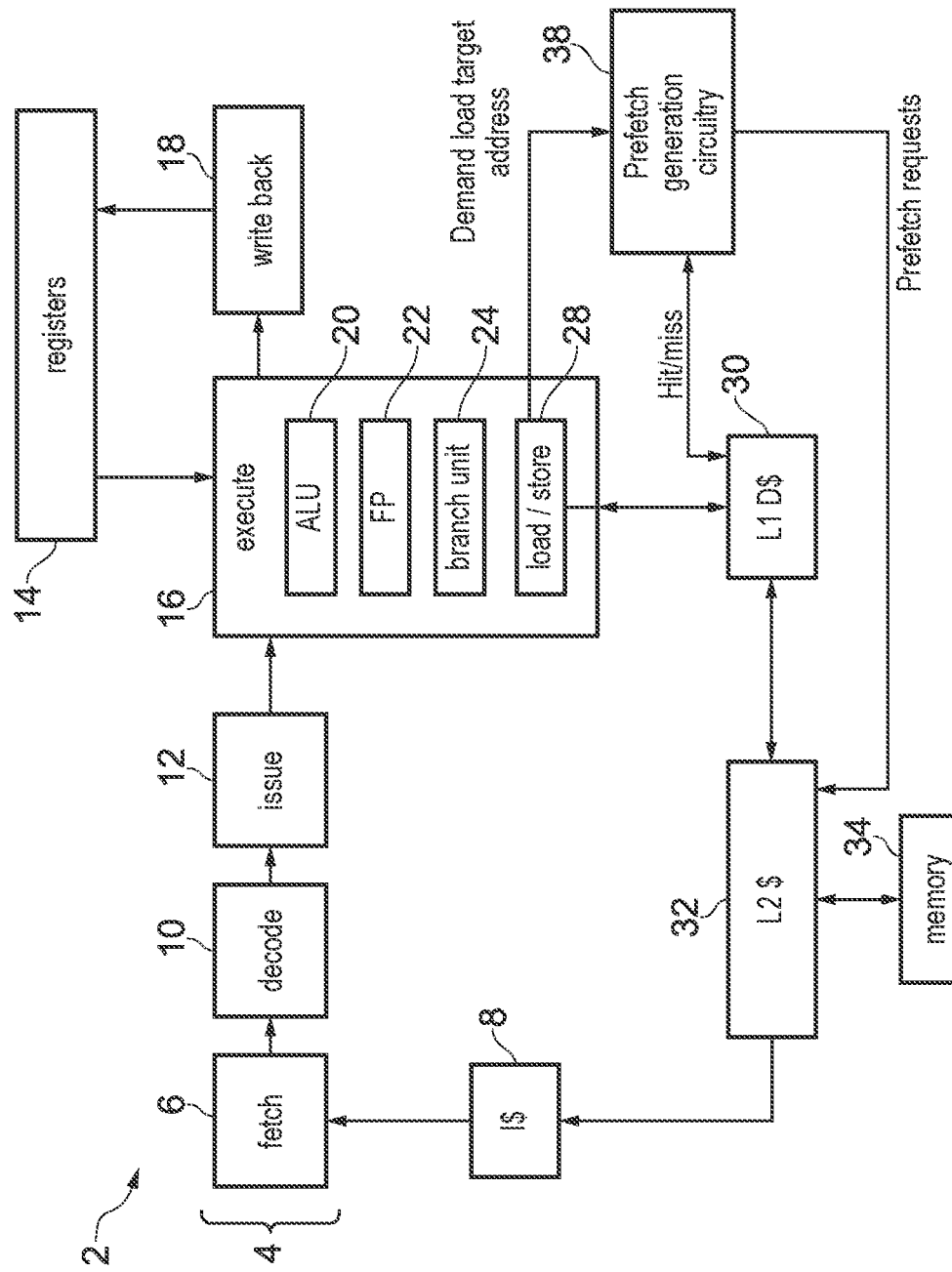
FIG. 1 schematically illustrates an apparatus according to some configurations of the present techniques.

Before discussing the configurations with reference to the accompanying figures, the following description of configurations is provided.

Some apparatuses provide local storage circuitry (for example, a data cache) in which data items that are requested by memory access circuitry can be stored. The provision of associative storage structures comprising N ways allows data items to be stored in one of N possible locations within the storage structure resulting in a greater chance of a hit in the local storage structure compared to, for example, a direct mapped storage structure in which there is only a single location in which any given data item could be stored. As a result, a lookup in a local storage structure generally requires the N possible locations to be checked in order to determine if a requested data item is present in the cache.

In some example configurations there is provided an apparatus comprising memory access circuitry responsive to one or more types of memory access request, to retrieve data items specified in the one or more types of memory access request from memory. The apparatus is also provided with local storage circuitry configured to store at least some of the retrieved data items. The local storage circuitry is N-way associative, and N is greater than 1. The apparatus is also provided with control circuitry responsive to an indication that an access request signalled to the local storage circuitry relating to an accessed data item corresponds to a predefined type of memory access request, to implement a restrictive access policy in relation to the accessed data item in the local storage circuitry. The restrictive access policy excludes at least one step of accessing an excluded subset of ways of the local storage circuitry.

The inventors have realised that for some predefined types of memory access request, it may be beneficial to restrict the ways of the local storage circuitry that are used to service the access request. The restriction includes defining an excluded subset of ways for which at least one step involved in accessing the ways is excluded (e.g., at least one step of reading ways belonging to the excluded subset is not performed) whilst servicing (responding to) the access request for the predefined (predetermined) type of memory access instruction. The excluded subset of ways includes at least one way of the N ways that are included in the N-way associative local storage circuitry. The number of ways N can be any integer greater than 1. In some configurations the number of ways is a power of 2, e.g., N=2, 4, 8, etc. Due to the reduced number of ways for which all steps involved in accessing the data stored in the ways are required in the lookup (e.g., N minus the number of excluded ways), this approach reduces the power consumption associated with the memory access and can improve performance by reducing the portion of the cache accessed in response to a single access request which can result in a reduction in bank conflicts.

In some configurations the control circuitry is responsive to access requests that do not correspond to the predefined type of memory access instruction to omit the implementation of the restrictive access policy for those access requests and to enable all steps involved in accessing each of the N ways in response to the memory access request. In this way the associativity of the cache can be tailored dependent on the type of the memory access request. In some configurations, the control circuitry may implement further access policies that act to restrict the number of ways accessed, for example, based on a metadata table indicative of validity of data items stored in one or more ways of the N ways. In such configurations the excluded access policy may be applied in addition to or as an alternative to such further access policies.

The different circuits, e.g., memory access circuitry, local storage circuitry, and control circuitry, identified as part of the apparatus may be provided as discrete and distinct blocks of circuitry each performing the functions described in relation to those circuits. Alternatively, the different circuits may be provided as one or more blocks of circuitry that either independently or collectively perform the functions described in relation to those circuits.

Whilst the excluded subset can comprise any one or more of the ways, in some configurations the excluded subset comprises N minus 1 ways. In other words, the restrictive access policy is configured to only consider a single way of the N ways when servicing the access request. In such configurations, where the restrictive access policy is implemented, N minus 1 of the ways need not be accessed in response to the memory access request resulting in a particularly low power memory access.

In some configurations the accessed data item is associated with an address and the excluded subset is defined based on one or more bits of the address. The one or more address bits may comprise one or more bits from an indexing portion of the address (e.g., bits of the address used to generate an index for a lookup in the storage structure) and/or one or more bits of a tag portion of the address (i.e., bits of the address used to identify a specific data item within one of the N ways of the storage structure). In some configurations, the address may comprise a data item identifying portion identifying an amount of data having a granularity sized to correspond to the amount of data storable in each entry of the local storage circuitry. In some configurations, the granularity may correspond to a cache line size. The one or more bits of the address used to define the excluded subset may comprise the least significant bits of an indexing portion of the data item identifying portion. For example, in some configurations in which the cache is provided as a 4 way set associative cache, the least significant two bits of the indexing portion may be used to select a non-excluded way such that the excluded subset of ways comprises the three ways that are not identified by the two least significant bits of the indexing portion. Using the lower bits to define the excluded subset provides a timing benefit when accessing the cache because the least significant bits of the indexing portion are computed sooner. Hence, this would provide a timing benefit when accessing the cache without hurting performance for streaming workloads for large data sets. In alternative configurations, the most significant bits of the indexing portion are used to define the excluded subset and/or one or more bits taken from a middle of an indexing portion may be used to define the excluded subset. Furthermore, in some configurations one or more of the more significant bits of the address, i.e., the bits of the address that are more significant than an indexing portion of the address, may be used to identify the excluded subset of ways. Using this approach may result in a greater cache utilisation which may offer improved performance in some use cases.

In some configurations the access request comprises a lookup request specifying an address of the accessed data item for generating an index at which to perform a lookup in the local storage circuitry. The index identifies a set (group of ways) of the local storage circuitry which could be used to store the data item. For example, in an N-way associative storage circuit, the storage circuit may comprise a plurality of individually indexable sets, each comprising N ways in which a data item having an address that identifies the index of that set could be stored. In alternative configurations, the local storage may be a fully associative storage structure.

The access request may be any type of access request, however, in some configurations the access request comprises an allocation request for the accessed data item to be allocated to the local storage circuitry and an address of the accessed data item for generating an index at which to store the accessed data item in the local storage circuitry. When allocating the data item to the local storage circuitry, the control circuitry is able to implement a simplified eviction policy in relation to data items already stored in the local storage circuitry.

The manner in which the predefined type of memory access request is detected may be variously implemented. In some configurations the predefined type of memory access request is generated based on a predefined type of memory access instruction; and the apparatus comprises decoder circuitry responsive to receipt of the predefined type of memory access instruction to signal the indication to the control circuitry. Decoder circuitry is provided in processing apparatuses to receive and interpret a particular set of instructions, known as an instruction set architecture (ISA), in order to generate control signals that cause the processing circuitry to operate in a particular way. The decoder circuitry may be configured to make the determination of the predefined type of memory access instruction based on the opcode identifying the instruction and/or one or more parameters included in the instruction.

In some configurations the predefined type of memory access instruction is any memory access instruction specifying a range of memory addresses meeting a predetermined condition. The range of memory addresses may be specified using any two of an address identifying a beginning memory address of the range, an address identifying an end memory address of the range, and/or a size of the address range. It would be readily apparent to the skilled person that alternative schemes to specify the range of memory address could be used. The predetermined condition may be hardwired into the decoder circuitry. Alternatively, the predetermined condition may be dynamically defined or specified under the control of a programmer or operating system.

In some configurations the predetermined condition is satisfied when the range of memory addresses meets a size threshold. The size threshold may be a minimum threshold such that the predetermined condition is met when the range of memory addresses specifies a region of memory greater than (or greater than or equal to) the size threshold. The size threshold may be hard wired into the control circuitry or may be dynamically configurable by a programmer or operating system.

The choice of the size threshold may be implementation dependent. In some configurations the size threshold is a function of capacity of the local storage circuitry. For example, the size threshold may be equal to the capacity of the local storage circuitry, a multiple (e.g., an integer multiple) of the capacity of the local storage circuitry, or a fraction of the capacity of the local storage circuitry (e.g., the size threshold is equal to the capacity of the local storage circuitry divided by N).

In some configurations the apparatus comprises storage monitoring circuitry configured to monitor accesses to the local storage circuitry, wherein the storage monitoring circuitry is configured to signal the indication to the control circuitry in response to a determination that accesses to the local storage circuitry structure meet an access condition. In some configurations, the monitoring circuitry may be configured to monitor sequential memory accesses to determine if the sequential memory accesses meet the access condition. The monitoring circuitry may be provided with pattern recognition circuitry configured to identify whether a pattern of either sequential or non-sequential memory accesses meet the access condition.

The access condition may be variously defined and, in some configurations, the access condition is met when the accesses sequentially specify memory addresses forming a contiguous region of address space exceeding a predetermined size. The storage monitoring circuitry may be provided with storage to track a region identifying memory address identifying the start of a contiguous region of address space. The region identifying memory address can be set in response to a memory access identifying an address that is not contiguous with the previous region of memory and maintained at a current value in response to a memory access identifying an address that is contiguous with the previous region of memory. A size of the contiguous region of addresses can then be determined from a comparison between the region identifying memory address and a current memory address identified as part of the memory access. Alternatively, the storage monitoring circuitry may be configured to store a size indication indicative of a size of a contiguous region of memory accessed by sequential memory accesses.

In some configurations the access condition is met when the accesses sequentially specify memory addresses forming a strided access pattern comprising a predetermined number of accesses. In some configurations the storage monitoring circuitry may be provided with stride recognition circuitry to recognise a stride length between memory accesses. The stride length recognition circuitry may be arranged to recognise a simple stride (a constant stride length between accesses) or may be able to recognise more complex strided patterns between memory accesses. The strided accesses to memory may occur either sequentially (for example, in an in-order core) or may occur out of sequence (for example, in an out-of-order core). Where the accesses occur out of sequence, the stride recognition circuitry may require additional storage to recognise the access pattern over a larger window of instructions.

In some configurations the control circuitry is responsive to a data presence indication indicating that one or more data items corresponding to the predefined type of memory access request are already stored in the excluded subset of ways to suppress the restrictive access policy. For some use cases the data items may already be present in the local storage structure, for example, due to an earlier (potentially unrelated) memory access request. When the control circuitry detects that these data items are present in the local storage structure but are stored in the excluded subset, for example, because the earlier memory access request was not of the predefined type, the control circuitry is configured to suppress the restrictive access policy. This approach avoids the potential for duplication both of data within the local storage circuitry and resource usage in order to transfer the data item to the local storage circuitry. The data presence indication may take the form of a back snoop received subsequent to a miss in the local storage circuitry.

Whilst the control circuitry may be configured to suppress the restrictive access policy only in reference to the data item already present in the local storage circuitry, in some configurations the control circuitry is configured to suppress the restrictive access policy until a further condition is met. The further condition may be dependent on the presence or absence of a subsequent data item from the excluded subset of ways. Alternatively, the further condition may be dependent on one or more metrics associated with the apparatus.

In some configurations the further condition comprises at least one of: a timing condition and the control circuitry comprises counter circuitry configured to store a count value indicative of a time subsequent to the data presence indication, the count value is reset in response to the data presence indication and the timing condition is met when the value exceeds a predetermined timing threshold; a confidence condition and the control circuitry is configured to monitor hits in the local storage circuitry to store information indicative of a hit rate of ways not included in the excluded subset of ways, and the confidence condition is satisfied when the information indicative of the hit rate meets a predetermined confidence threshold; and receipt of the indication in response to a further access request corresponding to the predefined type of memory access request. For the timing condition, the count value indicative of the time subsequent to the data presence may be a number of clock cycles, a number of instructions, or a number of memory accesses. In some configurations, the confidence condition may require the hit rate for sequential accesses to meet a predefined condition. The confidence condition may be applied in cases where the apparatus is provided with prefetch circuitry configured to generate prefetch requests identifying prefetch data to be retrieved for storage in the local storage circuitry in anticipation of a demand request for the prefetch data. For example, the prefetch circuitry may apply the restrictive access policy independently to the control circuitry and the control circuitry may apply the confidence condition in order to determine when data items that have been allocated to the local storage circuitry have been allocated using prefetch circuitry implementing the restrictive access policy. In some configurations the further condition may require a combination of the timing condition, the confidence condition and/or a further memory access request of the predefined type. For example, subsequent to the restrictive access policy being suppressed, the control circuitry may require a minimal time/number of accesses/number of hits in non-excluded ways to be identified prior to re-implementing the restrictive access policy even if the indication is received sooner.

In some configurations the predefined memory access request is at least one of: a memory copy instruction specifying data to be copied from a first range of memory addresses to a second range of memory addresses; a memory move instruction specifying data to be moved from the first range of memory addresses to the second range of memory addresses; and a predefined type of vector load instruction. memory copy instructions and memory move instructions can be used to transfer (e.g., copy or move) large amounts of data and may be implemented using a repeated sequence of micro-operations each requiring the loading of data from memory to the local storage structure and the saving of the data from the local storage structure to memory. Similarly, vector load instructions may exhibit stream or stride like behaviour when loading data. For example, in DGEMM (Double precision General Matrix-Matrix multiplication) operations large amounts of data may be loaded into the local storage structure in a repeated sequence. These types of memory access instructions can require a significant amount of cache usage. Hence, by applying the restrictive access policy for these types of memory access instruction a more significant power saving can be achieved.

In some configurations the apparatus comprises prefetch generation circuitry to generate prefetch requests identifying prefetch data to be retrieved for storage in the local storage circuitry in anticipation of a demand request for the prefetch data, wherein the prefetch generation circuitry is configured to determine whether the demand request for the prefetch data is anticipated to correspond to the predefined type of memory access request based on comparison of a pattern of prefetch requests to a predefined access pattern and, when the prefetch data is anticipated to correspond to the predefined type of memory access request, to trigger the control circuitry to implement the restrictive access policy when allocating the prefetch data to the local storage circuitry. A demand request is a request for a specific data item that is issued at a time of execution (independent as to whether that execution is itself speculative or not) of an instruction requesting the specific data item. A prefetch request is a speculative request for the specific data item that is issued in advance of an anticipated (predicted) execution of the instruction which would issue a demand request for the specific data item. Prefetching is a technique used by a data processing apparatus to mitigate against the latency associated with memory accesses, by initiating the retrieval of data values or instructions from memory before the data processing apparatus encounters the corresponding instructions to issue a demand request for those data values or instructions. Prefetching may occur, for example, where the prefetch circuitry identifies a pattern associated with one or more loads. For example, the one or more loads could correspond to data values that are positioned sequentially in memory or that are separated by a (fixed or predictably variable) stride length. The prefetch generation circuitry is configured to identify when the one or more prefetches correspond to the predefined type of memory access, for example, through reference to one or more prediction tables that have been trained to recognise typical memory access patterns that are associated with the predefined type of memory access. When the prefetch generation circuitry recognises that the prefetches are associated with the predefined type of memory access, the prefetch generation circuitry signals to the control circuitry to trigger the implementation of the restrictive access policy. Signalling between the prefetch generation circuitry and the control circuitry may be implemented using a dedicated signalling path between the control circuitry and the prefetch generation circuitry. Alternatively, the prefetch generation circuitry may be configured to apply a tag to the prefetch request to trigger application of the restrictive access policy in response to the hardware prefetch request. In other words, the tag is applied to the prefetch request to indicate that the prefetch data is anticipated to be required by a data access request of the predefined type and the memory access circuitry is configured to signal the indication to the control circuitry using one of the mechanisms described above.

In some configurations the control circuitry is configured: to apply the restrictive access policy independently to prefetch requests and demand requests; prior to implementing the restrictive access policy in relation to the demand requests and in response to the indication, to monitor hits in the local storage circuitry to determine whether a hit rate of ways not included in the excluded subset of ways satisfies a predetermined confidence condition; when the predetermined confidence condition is met, to implement the restrictive access policy; and when the predetermined confidence condition is not met, to defer implementing the restrictive access policy. Prefetch requests may be issued many cycles in advance of the demand requests for the data allocated to the local storage circuitry in response to the prefetch requests. The restrictive access policy may therefore be advantageously applied to prefetch requests whilst not being applied to demand requests (i.e., the restrictive access policy is suppressed for demand requests). As a result, the restrictive access policy may be applied to the prefetch requests whilst the demand requests are consuming data that was provided before the restrictive access policy was applied. In such configurations, the control circuitry is configured to monitor whether or not hits in the local storage circuitry in response to demand accesses correspond to ways that would be included in the excluded subset of ways if the restrictive access policy were applied. When it is determined that the hits satisfy a predetermined confidence condition, for example, that a number of sequential hits in ways that are not included in the excluded subset of ways meets a predefined threshold, the restrictive access policy may be implemented for demand accesses. Otherwise, the restrictive access policy may be suppressed for demand accesses until the predetermined confidence condition is met.

Whilst excluding the at least one step of accessing the excluded subset of ways may comprise excluding all steps of accessing the excluded subset of ways, in some configurations the local storage circuitry is configured to store each retrieved data item in association with tag data indicating an address associated with that retrieved data item; the at least one step of accessing the excluded subset of ways comprises accessing the retrieved data item of the excluded subset of ways; and the control circuitry is configured to read information indicative of the tag data for all ways of the local storage circuitry and, in response to a determination that the restrictive access policy misses in the local storage circuitry and that the information indicative of the tag data indicates a hit in a different way of the local storage circuitry, to suppress the restrictive access policy and to access the retrieved data item based on the information indicative of the tag data. The information indicative of the tag information may comprise tag information stored in each way of local storage circuitry in association with the stored data. This approach still results in a reduced power consumption when accessing the local storage circuitry because at least the data items stored in the excluded subset of ways are not accessed when the restrictive access policy is applied.

In some configurations the apparatus comprises micro-tag storage arranged to store information indicative of the tag data for all ways of the local storage circuitry; the at least one step of accessing the excluded subset of ways comprises reading information from the excluded subset of ways; the control circuitry is configured to read the information indicative of the tag data for all ways of the local storage circuitry from the micro-tag storage in parallel to performing a lookup in the local storage circuitry excluding the restricted subset of ways; and in response to a determination that the restrictive access policy misses in the local storage circuitry and that the information indicative of the tag data indicates a hit in a different way of the local storage circuitry, to suppress the restrictive access policy and to replay the lookup. The micro-tag storage may be provided as a low cost storage structure separate to the local storage structure and may be arranged as an N-way set associative cache with each entry corresponding to an entry of the local storage structure. The information indicative of the tag data is read in parallel to accessing the ways in the local storage structure that are not included in the excluded subset of ways. Where the restrictive access policy results in a hit, the information read from the micro-tag storage can be discarded. When the restrictive access policy misses in the local storage structure, the control circuitry can determine whether or not a lookup in all ways of the local storage structure (i.e., suppressing the restrictive lookup policy) would have resulted in a hit using the information indicative of the tag data. As a result, a miss using the restrictive access policy can be quickly replayed with the restrictive access policy suppressed if the data were already present in one of the excluded subset of ways. The lookup in the micro-tag cache may be based on an address of the data item which may be a virtual address used by the processor or a physical address computed based on the virtual address, for example, by performing a lookup in a translation lookaside buffer (TLB) or by performing a page table walk to determine the physical address from page tables stored in memory. In some configurations, the micro-tag storage stores information indicative of a virtual tag associated with a virtual address of the data item. This approach allows for the tags stored in the micro-tag storage structure to be checked sooner, i.e., before a physical address associated with the data item is computed. For configurations in which the local storage structure is a physically tagged storage structure, the lookup in the micro-tag storage can provide an indication as to whether a data item is stored in the local storage structure in advance of the lookup using the restrictive access policy in the local storage structure. In some configurations the virtual tag is stored as a hash of a virtual address portion. The hash of the virtual address portion may be a lossy hash reducing the amount of data that is stored in the micro-tag storage. Whilst this approach may result in false hits in the micro-tag storage, the overall benefit achieved by reducing the number of ways read out of the local storage structure can outweigh any performance loss associated with a false hit in the micro-tag cache. In some configurations the control circuitry is responsive to a hit in the micro-tag storage in combination with a miss in the local storage circuitry when implementing the restrictive access policy (i.e., the restrictive access policy triggers a false miss), to modify one or more items of state associated with the restrictive access policy. For example, the control circuitry may be configured to modify a confidence level associated with the restrictive access policy to reduce the confidence associated with implementing the restrictive access policy. Alternatively, or in addition, a count value indicative of a time subsequent to the false miss may be reset in response to the false miss.

Particular configurations will now be described with reference to the figures.

FIG. 1 schematically illustrates an example of an apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor an additional register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel.

As shown in the example of FIG. 1, the apparatus 2 has prefetch generation circuitry 38 for analysing patterns of demand target addresses specified by demand memory access requests issued by the load/store unit 28, and detecting address access patterns which can subsequently be used to predict addresses of future memory accesses. For example, the address access patterns may involve stride sequences of addresses where there are a number of addresses separated at regular intervals of a constant stride value. It is also possible to detect other kinds of address access patterns (e.g. a pattern where subsequent accesses target addresses at certain offsets from a start address). The prefetch generation circuitry 38 maintains prefetch state information representing the observed address access patterns, and uses the prefetch state information to generate prefetch requests which are issued to the memory 34 via the L2 cache 32 to request that data is brought into a given level of cache. For example, when a trigger event for a given access pattern is detected (e.g. a pattern of demand addresses corresponds to the given access pattern, or a load access to a particular trigger address being detected), the prefetch generation circuitry 38 may begin issuing prefetch requests for addresses determined according to that pattern. The prefetch load requests are not directly triggered by a particular instruction executed by the pipeline 4, but are issued speculatively with the aim of ensuring that when a subsequent memory access request, for example, a load/store instruction, reaches the execute stage 16, the data it requires may already be present within one of the caches, to speed up the processing of that load/store instruction and therefore reduce the likelihood that the pipeline has to be stalled.

The prefetch generation circuitry 38 may be able to perform prefetching into a single cache or into multiple caches. For example, FIG. 1 shows an example of the prefetch generation circuitry 38 issuing level 1 cache prefetch requests which are sent to the level 2 cache 32, which may then, subsequently, be passed via any further levels of cache to downstream memory 34 and request that data from a prefetch target addresses is brought into the level 1 data cache 30. As shown in FIG. 1, as well as the demand target addresses issued by the load/store unit 28, the training of the prefetch generation circuitry 38 may also be based on an indication of whether the corresponding demand memory access requests hit or miss in the level 1 data cache 30. The hits/miss indication can be used for filtering the demand target addresses from training. This recognises that it is not useful to expend prefetch resource on addresses for which the demand target addresses would anyway hit in the cache.

In the illustrated configuration the prefetch generation circuitry 38 is also trained based on a type of the micro operation received by the load/store unit, in combination with the demand load target addresses received from the load/store unit 28, indicating whether or not the demand load target addresses received by the prefetch generation circuitry 38 correspond to memory access requests of the predetermined type. Based on this training the prefetch generation circuitry 38 is configured to determine whether a prefetch request anticipates a demand request from a predetermined type of instruction and, where this is the case, to indicate to the L1 data cache 30 that the prefetch data corresponds to a predefined type of memory access request thereby triggering the L1 data cache 30 to implement the restrictive access policy in relation to the prefetch data when allocating the prefetch data item to the L1 data cache 30. It will be appreciated that FIG. 1 is merely a simplified representation of some components of a possible apparatus, and the apparatus may include many other elements not illustrated for conciseness, such as branch prediction mechanisms or address translation or memory management mechanisms.

Figure 2:
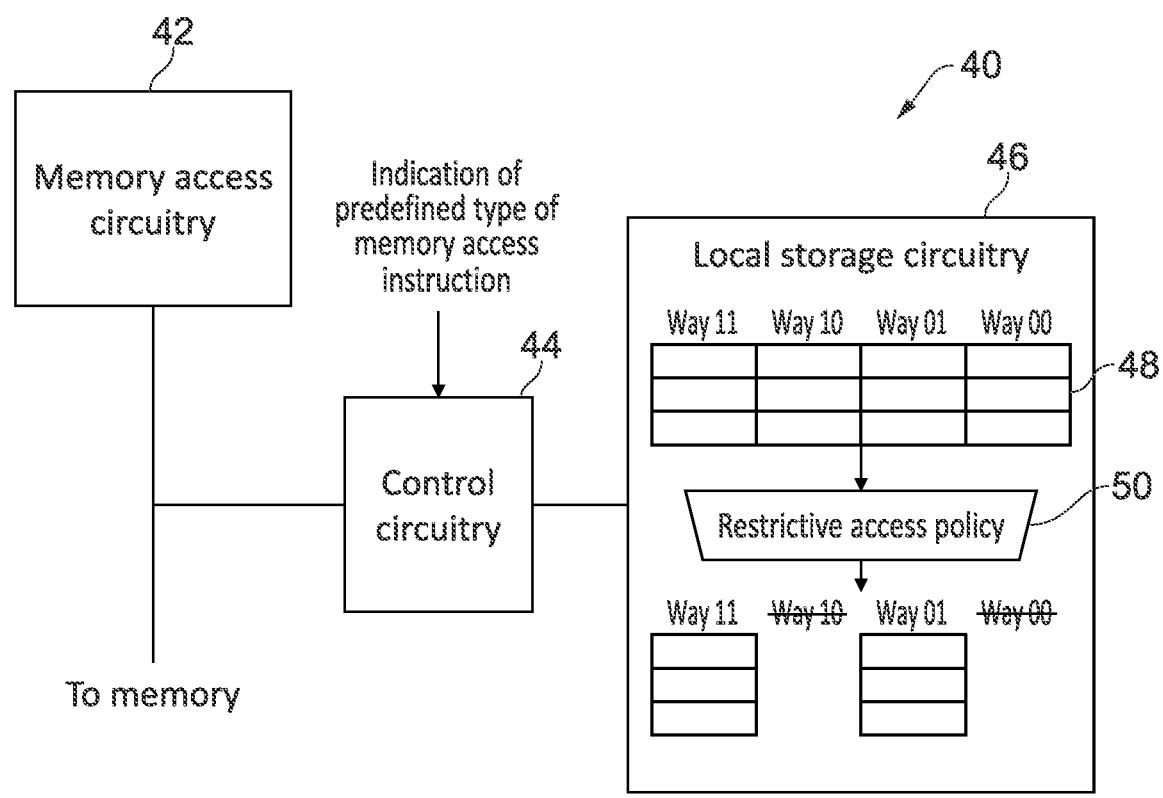
FIG. 2 schematically illustrates an apparatus according to some configurations of the present techniques.

FIG. 2 schematically illustrates an apparatus 40 according to some configurations of the present techniques. The apparatus 40 is provided with memory access circuitry 42, control circuitry 44, and local storage circuitry 46. The memory access circuitry is responsive to one or more memory access requests to trigger retrieval of data items specified in the one or more memory access requests from memory. The local storage circuitry 46 (for example a L1 data cache) is arranged as a set associative cache which is able store each given data item in a plurality of ways 48 including way 00, way 01, way 10, and way 11. The control circuitry 44 is arranged to implement access policies in relation to memory access requests from the memory access circuitry 42. For example, the control circuitry 44 may be arranged to trigger implementation of a restrictive access policy 50 in response to an indication that a particular memory access request is of a predefined type. When the restrictive access policy 50 is triggered, the access request is restricted such that only a restricted subset of the ways 48 are accessed and an excluded subset of the ways 48 are excluded (not accessed). In the illustrated configuration when the restrictive access policy 50 is triggered way 01 and way 11 are accessed whilst way 00 and way 10 are excluded from the data access. Because way 00 and way 10 are excluded, the local storage circuitry is able to respond to the access request without reading those ways resulting in a reduced power consumption when the restrictive access policy is triggered. It would be readily apparent to the person of ordinary skill in the art that the choice of way 00 and way 10 as the excluded ways is merely one possible example and any one or more of the ways 48 could be defined as the excluded subset of ways.

Figure 3:
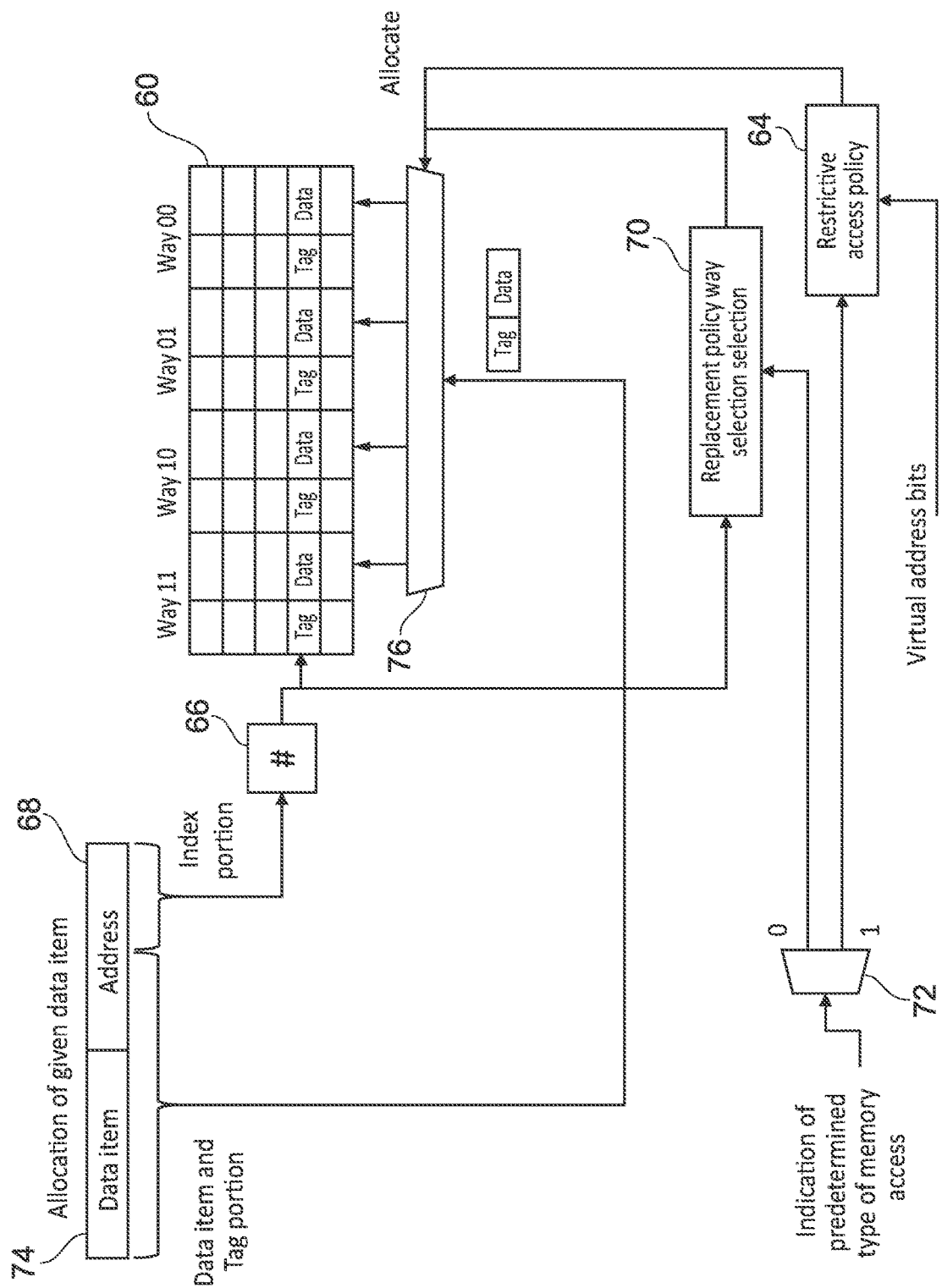
FIG. 3 schematically illustrates allocation of data items to local storage according to some configurations of the present techniques.

FIG. 3 schematically illustrates allocation of a data item 74 associated with an address 68 to a local storage structure 60 arranged as a 4 way set associative cache. In the illustrated configuration the cache is a physically indexed physically tagged cache and the address is a physical address which has been obtained from a corresponding virtual address, for example, using a translation lookaside buffer or a page table walk. The data item 74 in a set of the local storage structure 60 identified by an index which is generated from an index portion of the address 68. The generation of the index from the index portion of the address 68 is performed using hash circuitry 66. The allocation within the indexed portion (set) of the cache is dependent on whether or not an indication of a predetermined type of memory access has been received by the switch circuitry 72. Where no indication of a predetermined type of memory access has been received by the selection circuitry 72 the output "0" of the selection circuitry 72 is high and the replacement policy way selection circuitry 70 is triggered. The replacement policy way selection circuitry 70 determines a way of the 4-way associative cache in which to store the data item, for example, based on the cache index output by the hash circuitry 66 and a cache replacement policy and with reference to a metadata table indicative of utilisation of the cache. Once the replacement policy way selection circuitry 70 has determined a particular way in which to store the data item, the replacement policy way selection circuitry 70 indicates the way to which the data item is to be allocated to the de-multiplexing circuitry 76 which allocates the tag information and the data information to the way indicated by the replacement policy way selection circuitry 70.

Where an indication of a predetermined type of memory access has been received by the selection circuitry 72 the output "1" of the selection circuitry 72 is high and the restrictive access policy 64 is triggered. In the illustrated configuration, the restrictive access policy 64 is configured to identify the way to which the data item is to be allocated through exclusion of an excluded subset of ways based on the virtual address associated with the data item, e.g., the virtual address before it was converted into a physical address. The restrictive access policy 64 indicates the way to which the data item is to be allocated to the de-multiplexing circuitry 76 which allocates the tag information and the data information to the way indicated by the restrictive access policy 64.

Figure 4:
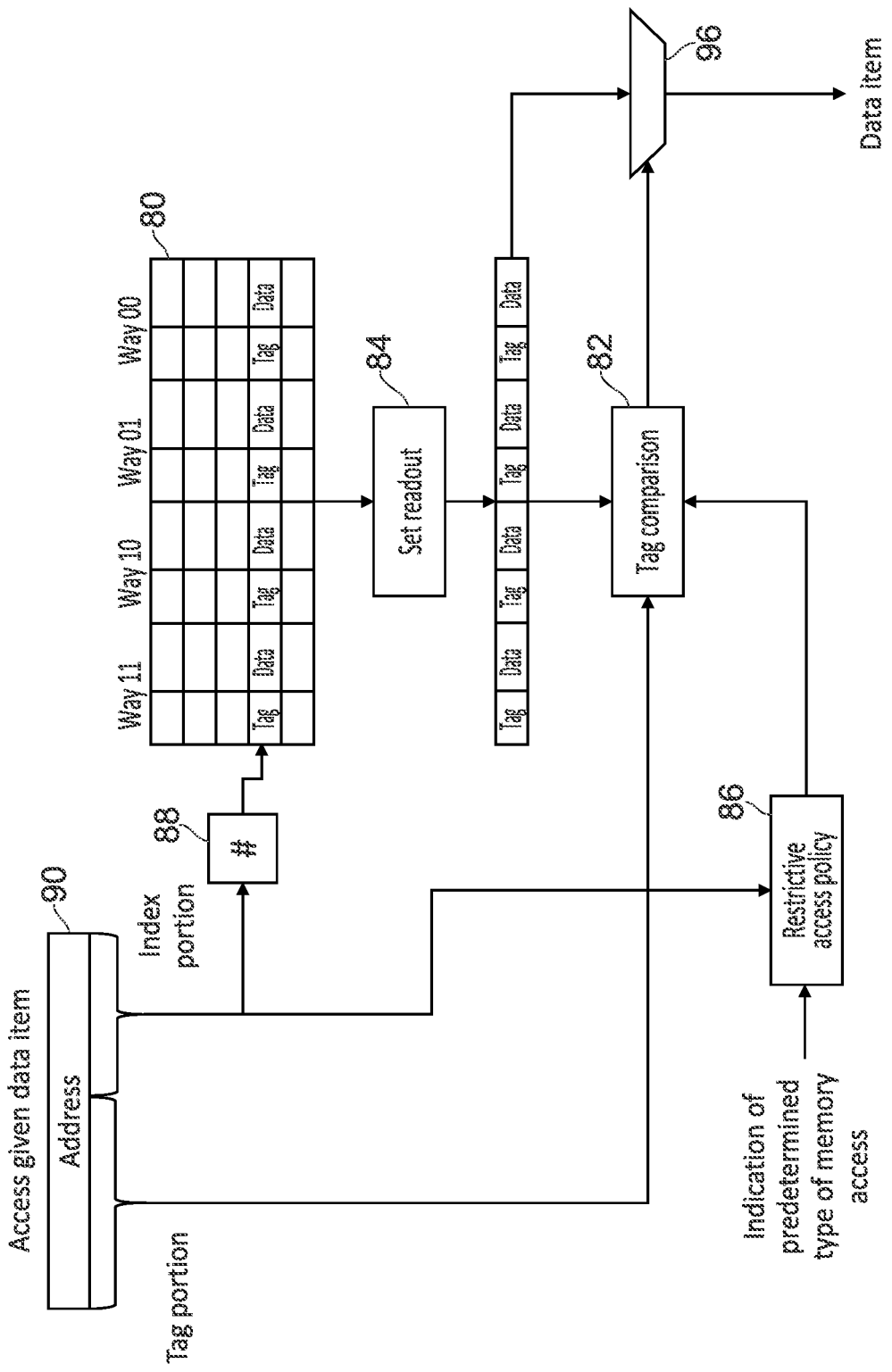
FIG. 4 schematically illustrates accessing of data items in local storage according to some configurations of the present techniques.

FIG. 4 schematically illustrates details of an apparatus for reading of a given data item from local storage circuitry 80 according to some configurations of the present techniques. The apparatus comprises the local storage circuitry 80, hash generating circuitry 88, set readout circuitry 84, tag comparison circuitry 82, and multiplexor 96. The apparatus is also provided with restrictive access policy circuitry 86 configured to hold details of the restrictive access policy. On receipt of an address 90, an index portion of the address is provided to the hash circuitry 88 which generates an index by computing a hash of the index portion of the address 90. The index generated by the hash circuitry 88 is used to identify a set of the local storage circuitry 80 in which tag comparison will take place to determine whether or not a data item associated with the address 90 is stored in the local storage circuitry 80.

The set readout circuitry 84 is configured to provide the selected set to the tag comparison circuitry 82. The tag comparison circuitry 82 performs a comparison of the tag portion of data item 90 against one or more of the entries in the set. When the restrictive access policy 86 is triggered (in response to receipt of an indication of a predetermined type of memory access), then the restrictive access policy circuitry 86 triggers the tag comparison circuitry 82 to perform the tag comparison excluding the excluded subset of ways. The tag comparison circuitry passes an indication of the way in which a tag hit occurs to the multiplexor 96 which outputs the data item. When no indication of the memory access being of the predetermined type is received, then the restrictive access policy 86 is not triggered and the tag comparison circuitry 82 performs the tag comparison for all ways in the read out set.

It would be readily apparent to the skilled person that, in some alternative configurations, the set readout circuitry 82 may be configured to perform a lookup in a metadata table metadata indicative of valid entries of the local storage circuitry. The set readout circuitry 82 may then be configured to omit readout of invalid entries of the local storage circuitry 80. This omission may be applied prior to the application of the excluded access policy such that the ways read out when the restricted access policy is not applied comprise all ways indicated as valid (i.e., excluding invalid ways) by the metadata, and the ways read out when the restricted access policy is applied comprise all valid ways that are not in the excluded subset (i.e., excluding invalid ways and excluding ways that are in the restricted subset).

Figure 5:
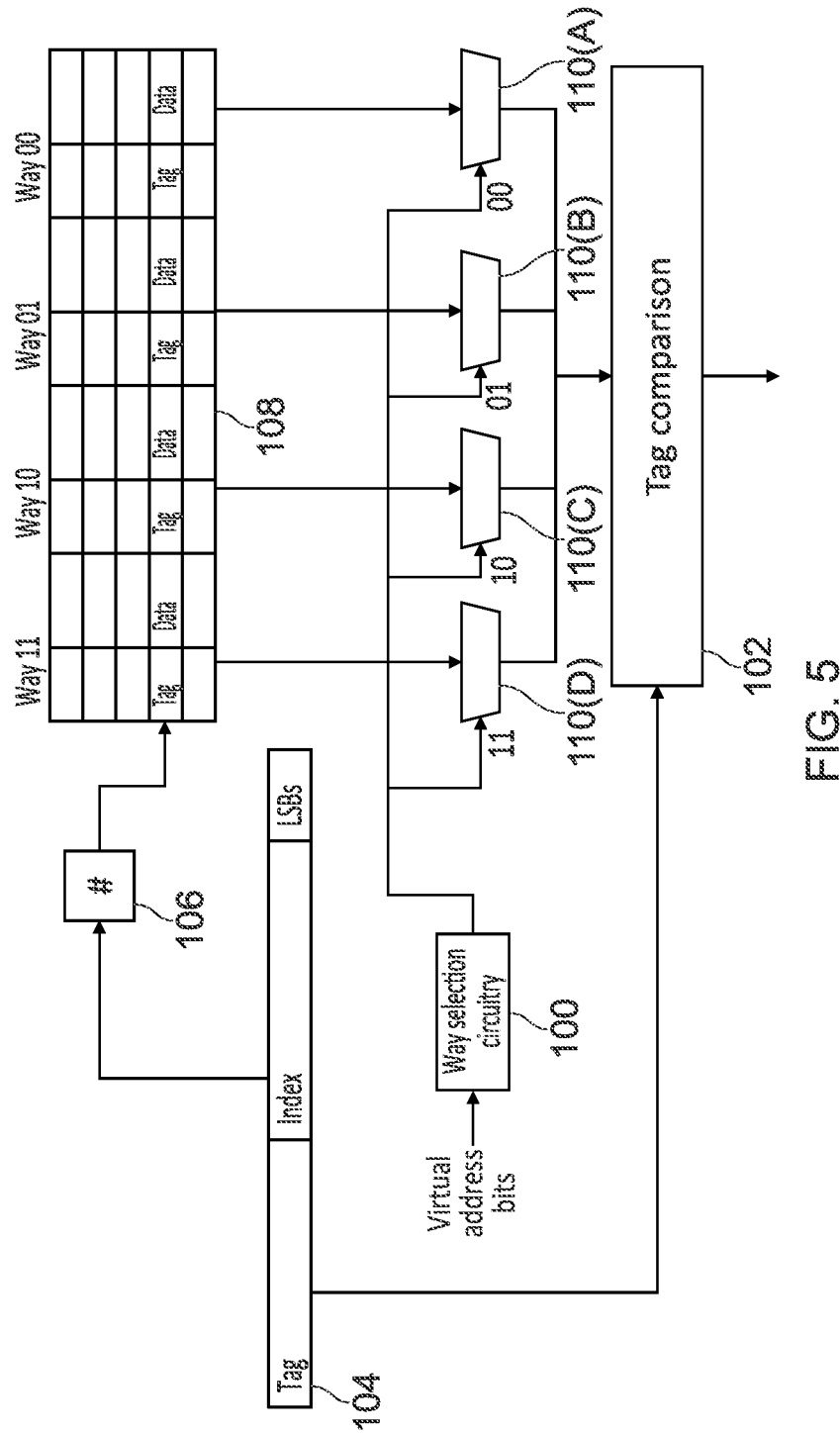
FIG. 5 schematically illustrates accessing of data items in local storage according to some configurations of the present techniques.

FIG. 5 schematically illustrates details of the definition of the ways to be accessed when the restrictive access policy is applied according to some configurations of the present techniques. In the illustrated configuration, the local storage circuitry 108 comprises 4 ways: way 00, way 01, way 10, and way 11. The local storage circuitry is a set associative cache with each set comprising 4 ways and identified based on an index derived from an index portion of an address 104 using hash circuitry 106. The address 104 is a physical address, for example, derived from a virtual address using a translation lookaside buffer or a page table walk. The address 104 also comprises a tag portion and one or more least significant bits (LSBs). The address portion 104 expresses an address at level of granularity of a single byte. However, the local storage circuitry stores data addressed on a level of granularity of multiple bytes (for example, a cache line level of granularity). The LSBs are therefore bits of the address 104 that not required in order to distinguish between the different data items stored in the local storage circuitry.

In the illustrated configuration, the restrictive access policy is defined such that only a single way of the plurality of ways is accessed for a given address. The choice of the way to be accessed is dependent on the virtual address from which the address 104 is derived. In particular, way selection circuitry 100 receives one or more bits of the virtual address. The way selection circuitry 100 applies a function to the received bits of the virtual address, for example, a hash function, to generate two way selection bits. The way selection bits are passed to a set of switches 110. When the way selection bits take values 00, switch 110(A) is activated and way 00 is read from the set identified by the index portion of the address 104 of the local storage circuitry 108 and is passed to tag comparison circuitry 102. When the way selection bits take values 01, switch 110(B) is activated and way 01 is read from the set identified by the index portion of the address 104 of the local storage circuitry 108 and is passed to tag comparison circuitry 102. When the way selection bits take values 10, switch 110(C) is activated and way 10 is read from the set identified by the index portion of the address 104 of the local storage circuitry 108 and is passed to tag comparison circuitry 102. When the way selection bits take values 11, switch 110(D) is activated and way 11 is read from the set identified by the index portion of the address 104 of the local storage circuitry 108 and is passed to tag comparison circuitry 102. The tag comparison circuitry 102 receives the way output that has been passed from one of the switches 110 and performs a tag comparison to determine if the tag of the received way matches the tag portion of the address 104. If a match is identified then the tag comparison circuitry 102 outputs the data item. If a match is not identified then the tag comparison circuitry 102 outputs an indication that the lookup in the local storage circuitry 108 has missed to trigger the access request to be passed to a next level of storage circuitry.

Figure 6A:
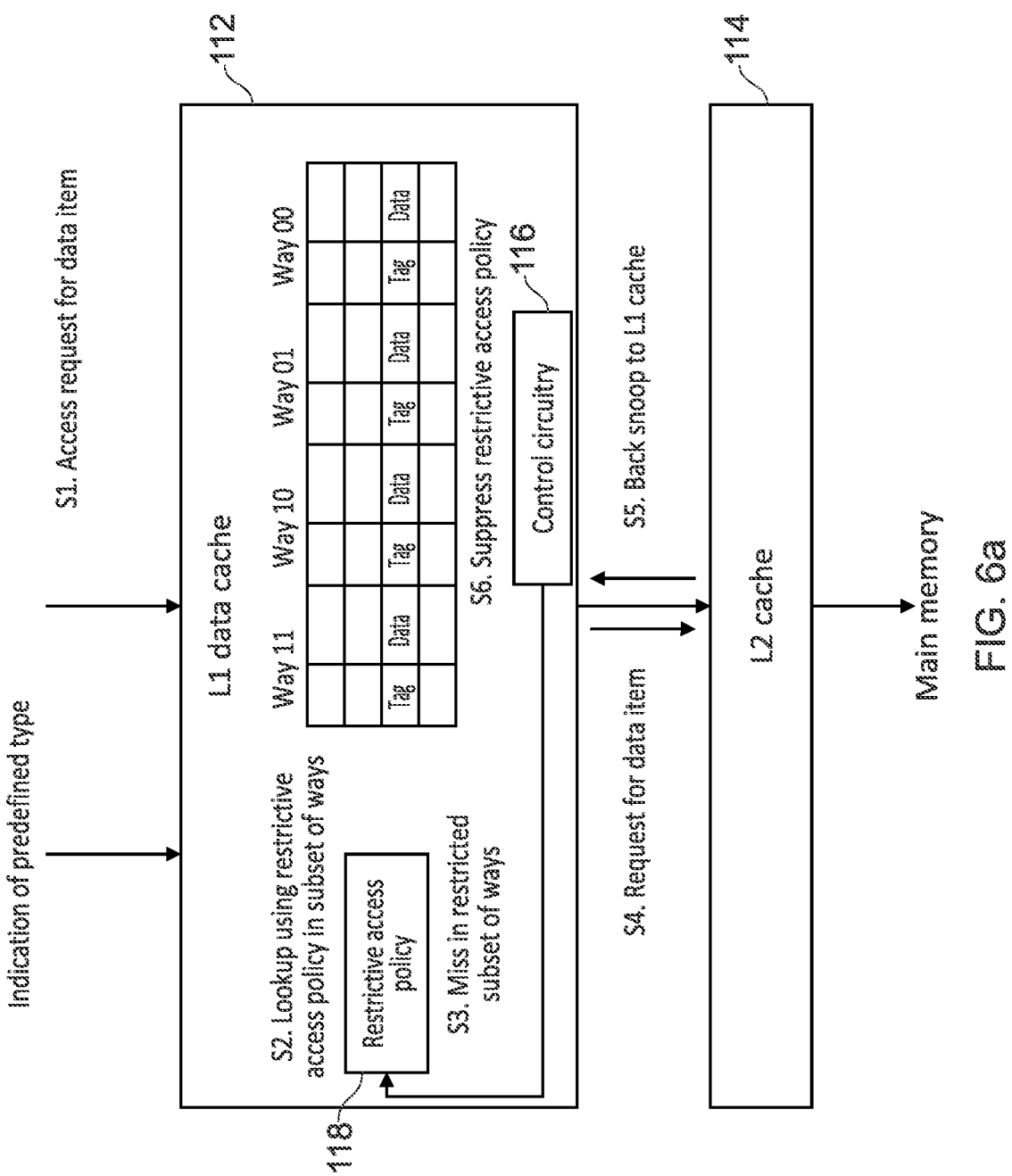
FIG. 6a schematically illustrates an access request according to some configurations of the present techniques.

FIG. 6a schematically illustrates a sequence of steps carried out by the L1 data cache 112 (an example of local storage circuitry) in response to an access request for a given data item according to some configurations of the present techniques. In the illustrated configuration, it is assumed that a requested data item is present in the L1 data cache but (e.g., coincidentally due to an earlier unrelated access), the requested data item is present in one of the excluded ways. In a step S1 an access request for a data item is received by the L1 data cache 112. The requested data item is identified by an address which is used by the L1 data cache 112 as the basis for a lookup. The L1 data cache 112 also receives an indication that the access request is of the predefined type such that control circuitry 116 (comprised in the L1 data cache) is triggered to implement a restrictive access policy 118. In step S2 the L1 data cache 112 performs a lookup using the restrictive access policy 118, the restrictive access policy defining an excluded subset of ways to be excluded from the lookup. In general, if the lookup were to result in a hit in the local storage circuitry, then the data item would be returned in response to the access request. However, as discussed, it is assumed that the requested data item is present in the L1 data cache, but is stored in one of the excluded ways, and at step S3 the L1 data cache returns a miss in the non-excluded subset of ways. As a result of the miss in the L1 data cache, at step S4, the access request for the data item is passed to a further level of the cache hierarchy. In the illustrated example, the access request is passed to the L2 cache 114 which is provided with snoop circuitry configured to issue snoop requests to determine which caches hold copies of the requested data. The L2 cache 114 may be provided with a snoop filter which tracks which addresses are cached in caches of different processing elements. In the illustrated configuration the L2 cache 114 determines, based on the snoop filter, that a copy of the requested data item is held in the L1 data cache 112 and, at step S5, issues a back snoop to the L1 data cache 112. At step S6 the control circuitry 116 of the L1 data cache 112 responds to the back snoop and triggers the suppression of the restrictive access policy. The L1 data cache will subsequently perform a lookup without applying the restrictive access policy.

Figure 6B:
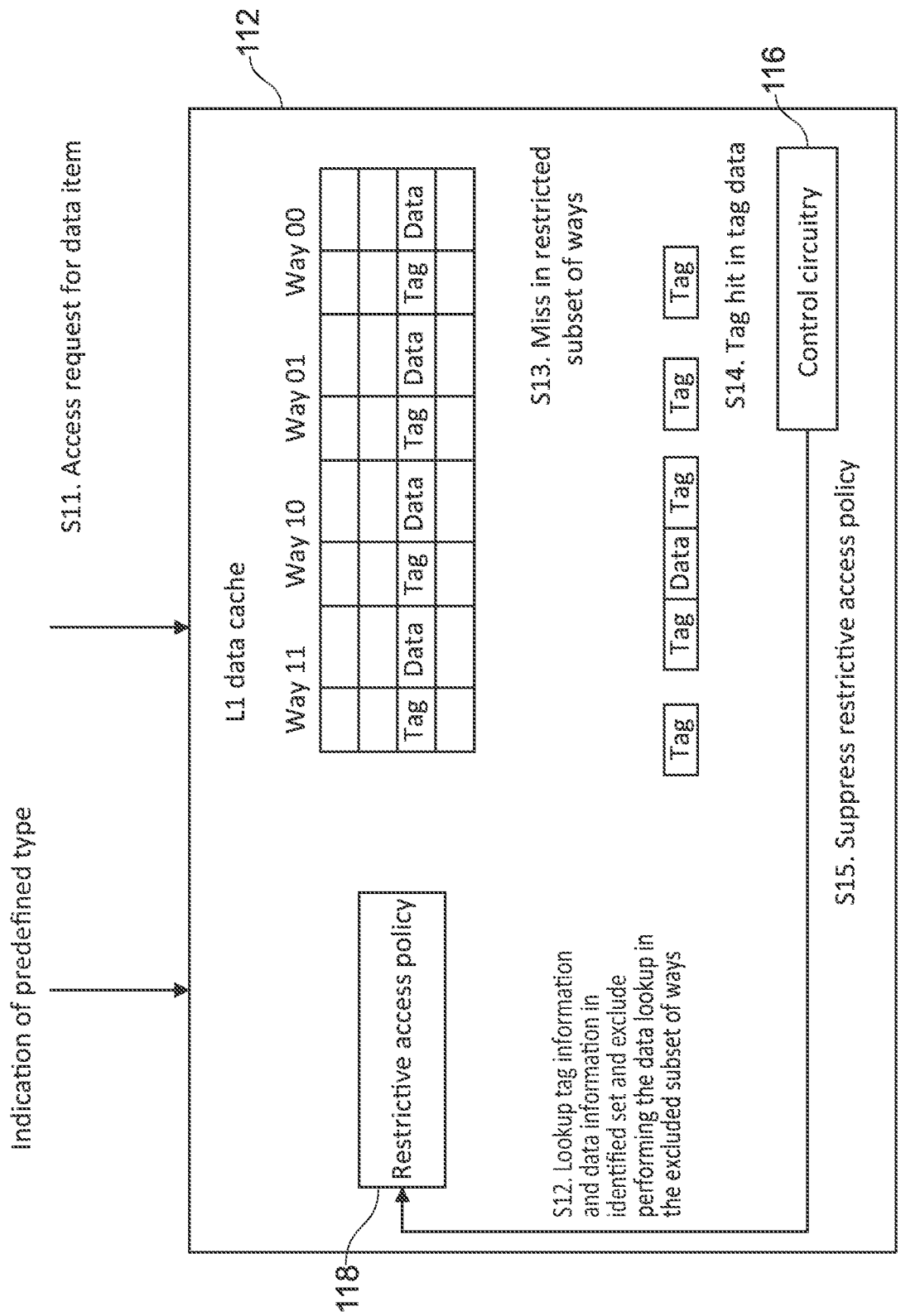
FIG. 6b schematically illustrates an access request according to some configurations of the present techniques.

FIG. 6b schematically illustrates a sequence of steps carried out by the L1 data cache 112 (an example of local storage circuitry) in response to an access request for a given data item according to some configurations of the present techniques. As in the case of FIG. 6a, it is assumed that a requested data item is present in the L1 data cache but (e.g., coincidentally due to an earlier unrelated access), the requested data item is present in one of the excluded ways. In a step S11 an access request for a data item is received by the L1 data cache 112. The requested data item is identified by an address which is used by the L1 data cache 112 as the basis for a lookup. The L1 data cache 112 also receives an indication that the access request is of the predefined type such that control circuitry 116 (comprised in the L1 data cache) is triggered to implement a restrictive access policy 118. In step S12 the L1 data cache 112 performs a lookup using the restrictive access policy 118. The lookup is performed by accessing the tag portion for all ways and suppressing the lookup in the data portion for the excluded subset of ways such that data information associated with ways not included in the excluded subset of ways is read. In general, if the lookup were to result in a hit in the local storage circuitry in the non-excluded way, then the data item would be returned in response to the access request. However, as discussed, it is assumed that the requested data item is present in the L1 data cache, but is stored in one of the excluded ways, and at step S13 the L1 data cache returns a miss in the non-excluded subset of ways but (in step S14) indicates a hit in one of the excluded subset of ways. As a result, at step S15 the control circuitry 116 of the L1 data cache 112 triggers the suppression of the restrictive access policy. The L1 data cache will subsequently perform a lookup without applying the restrictive access policy, i.e., the lookup will be performed in all ways of the L1 data cache.

Figure 7A:
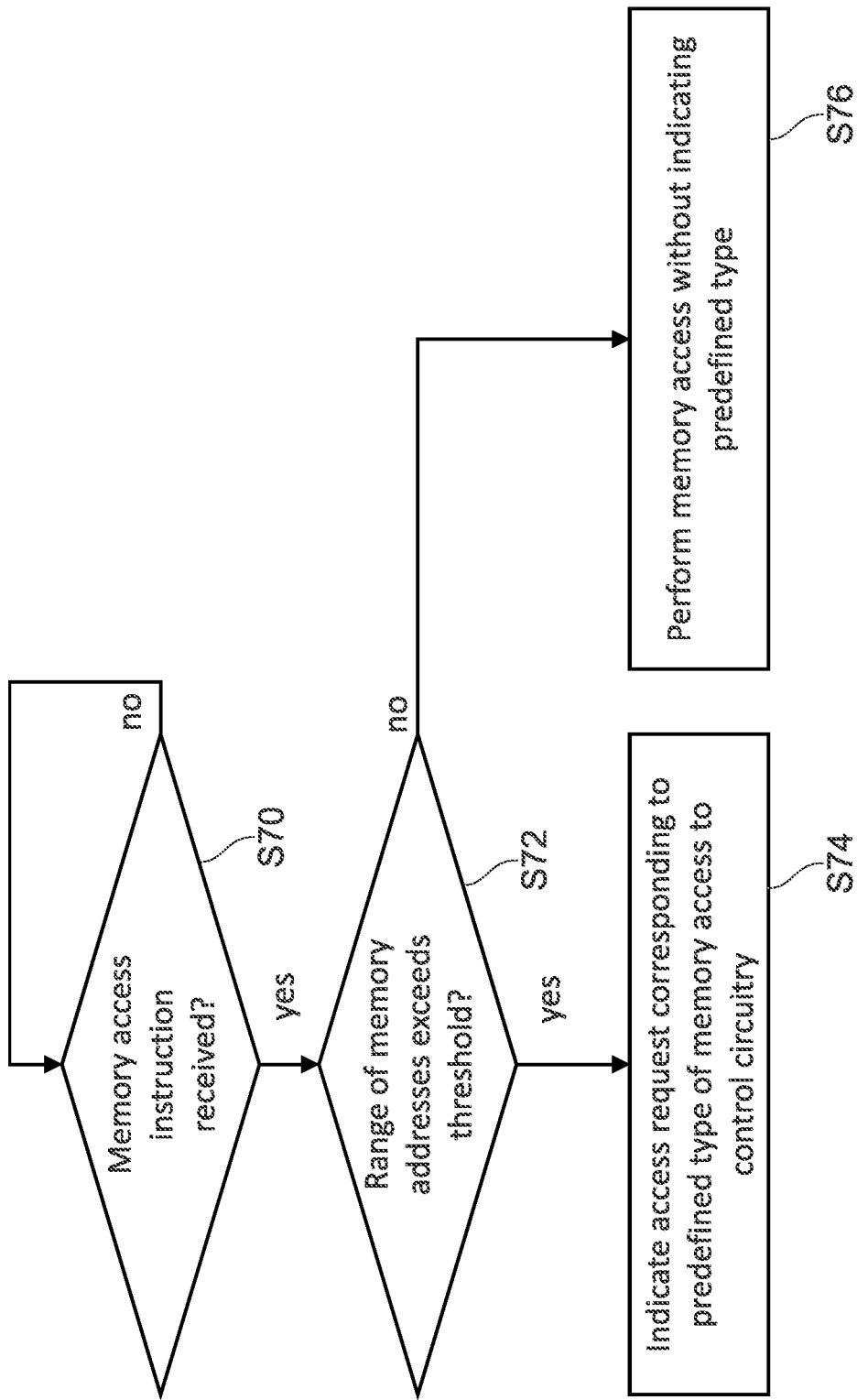
FIG. 7a schematically illustrates a sequence of steps carried out according to some configurations of the present techniques.

FIGS. 7a and 7b schematically illustrate a sequence of steps carried out the decoder circuitry in order to determine whether or not to indicate a predetermined type or memory access request.

FIG. 7a schematically illustrates a sequence of steps carried out by decoder circuitry in some configurations of the present techniques. Flow begins at step S70 where it is determined whether a memory access request has been received. If, at step S70, it is determined that a memory access request has not been received, then flow remains at step S70. If, at step S70, it is determined that a memory access instruction has been received, then flow proceeds to step S72 where it is determined whether a range of memory addresses specified by the memory access instruction exceeds a threshold. If, at step S72, it is determined that the range of memory addresses does not exceed a threshold then flow proceeds to step S76 where the decoder circuitry generates control signals to cause the memory access to be performed without indicating, to the control circuitry, that the memory access is of the predetermined type. If, at step S72, it was determined that the range of memory addresses exceeds the threshold, then flow proceeds to step S74 where the decoder circuitry generates control signals to cause the memory access to be performed and indicates, to the control circuitry, that the memory access is of the predefined type. For example, the indication may be provided by using a particular micro-operation or by setting one or more bits associated with the micro-operation.

FIG. 7b schematically illustrates a sequence of steps carried out by decoder circuitry in some configurations of the present techniques. Flow begins at step S700 where it is determined whether a memory access request has been received. If, at step S700, it is determined that a memory access request has not been received, then flow remains at step S700. If, at step S700, it is determined that a memory access request has been received, then flow proceeds to step S702 where it is determined whether the memory access instruction is a vector load instruction of a predefined type. If, at step S702, it is determined that the memory access instruction is not a vector load instruction of the predetermined type, then flow proceeds to step S706 where the decoder circuitry generates control signals to cause the memory access to be performed without indicating, to the control circuitry, that the memory access is of the predetermined type. If, at step S702, it was determined that the memory access instruction was a vector load instruction of a predefined type, then flow proceeds to step S704 where the decoder circuitry generates control signals to cause the memory access to be performed and indicates, to the control circuitry, that the memory access is of the predefined type. For example, the indication may be provided by using a particular micro-operation or by associating the micro-operation with one or more bits indicative that the micro-operation is of the predefined type.

FIG. 8 schematically illustrates a sequence of steps carried out by control circuitry according to some configurations of the present techniques. Flow begins at step S80 where it is determined if a memory access request has been received. If, at step S80, it is determined that a memory access request has not been received, then flow remains at step S80. If, at step S80, it is determined that a memory access request has been received, then flow proceeds to step S82 where it is determined if the memory access request is of a predefined type. For example, where the memory access request is a result of a memory access instruction received by decoder circuitry, the determination at step S82 could be made based on an indication of the micro operation type as described in relation to FIG. 7a or 7b. If, at step S82, it is determined that the memory access request is not of the predefined type, then flow proceeds to step S86 where the access continues without implementing the restrictive access policy. In other words, the access does not exclude any of the ways of the local storage structure when servicing the memory access request. If, at step S82, it was determined that the memory access request is of the predefined type, then flow proceeds to step S84 where the memory access is serviced through the implementation of a restrictive access policy that excludes accessing an excluded subset of the local storage circuitry.

Figure 9A:
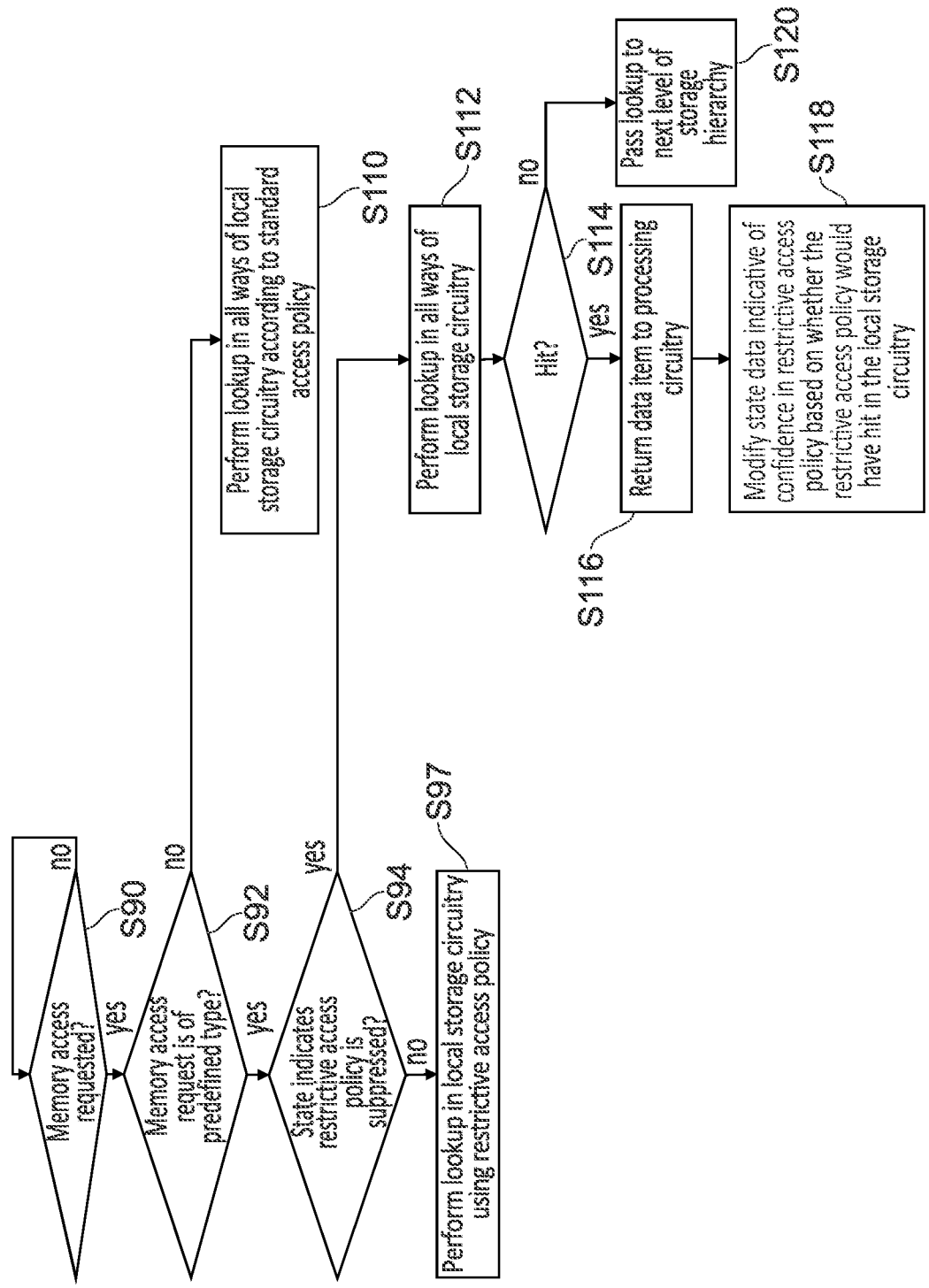
FIG. 9a schematically illustrates a sequence of steps carried out according to some configurations of the present techniques.

FIG. 9a schematically illustrates further details of a sequence of steps carried out by control circuitry according to some configurations of the present techniques. The initial steps are comparable to the steps described in relation to FIG. 8. Flow begins at step S90 where it is determined if a memory access request has been received. If, at step S90, it is determined that a memory access request has not been received, then flow remains at step S90. If, at step S90, it is determined that a memory access request has been received, then flow proceeds to step S92 where it is determined if the memory access request is of a predefined type. For example, where the memory access request is a result of a memory access instruction received by decoder circuitry, the determination at step S92 could be made based on an indication of the micro operation type as described in relation to FIG. 7a or 7b. If, at step S92, it is determined that the memory access is not of the predefined type, then flow proceeds to step S110 where the access continues without implementing the restrictive access policy, for example, through the implementation of a standard access policy. In other words, the access does not exclude any of the ways of the local storage structure when servicing the memory access request. If, at step S92, it was determined that the memory access request is of the predefined type, then flow proceeds to step S94 where the control circuitry determines whether or not a current circuitry state, for example, indicated through one or more flags and/or counters, indicates that the restrictive access policy is suppressed. If, at step S94, it is determined that the restrictive access policy is suppressed, then flow proceeds to step S112 where the access request is serviced by performing a lookup in all ways of the local storage circuitry. Flow then proceeds to step S114, where it is determined whether or not an address indicated in the access request hits in the local storage circuitry. If, at step S114, it is determined that there is not a hit in the local storage circuitry (i.e., the lookup misses in the local storage circuitry), then flow proceeds to step S120 where the lookup is passed to a next level of a storage hierarchy, for example, an L2 cache. If, at step S114, a hit was detected in the local storage circuitry, then flow proceeds to step S116 where a data item corresponding to the access request is returned to the processing circuitry. Flow then proceeds to step S118 where the state is modified to indicate the hit. For example, state data relating to a confidence level associated with the restrictive access policy may be modified based on whether or not the restrictive access policy would have hit in the local storage circuitry if it had not been suppressed. If, at step S94, it was determined that the state indicates that the restrictive access policy is not suppressed, then flow proceeds to step S97 where the control circuitry implements a restrictive access policy according to the above configurations. Some examples of the restrictive access policy implemented at step S97 are set out in FIGS. 9b and 9c.

Figure 9B:
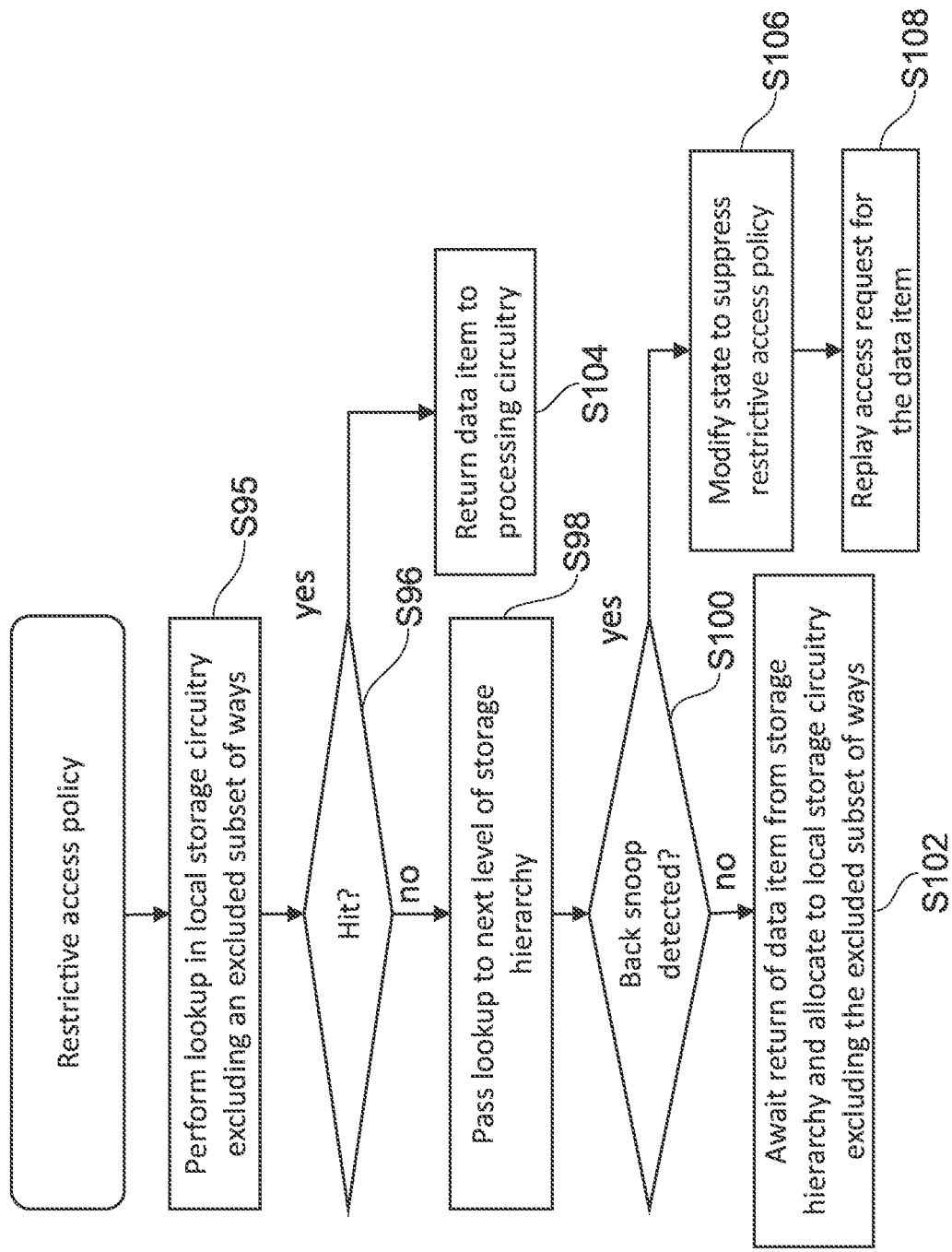
FIG. 9b schematically illustrates a sequence of steps carried out according to some configurations of the present techniques.

FIG. 9b schematically illustrates an example sequence of steps carried out by the control circuitry when implementing the restrictive access policy according to step S97 of FIG. 9a. Flow begins at step S95 where the control circuitry triggers a lookup in the local storage circuitry that excludes (i.e., does not perform a lookup in) an excluded subset of the ways. Flow then proceeds to step S96 where it is determined whether the lookup in the local storage circuitry has hit. If, at step S96, it is determined that there is a hit, then flow proceeds to step S104 where a data item is returned to the processing circuitry. If, at step S96, it was determined that there was not a hit (i.e., the lookup missed in the local storage circuitry), then flow proceeds to step S98 where the lookup is passed to the next level of the storage hierarchy. Flow then proceeds to step S100 where it is determined whether or not a back snoop from, e.g., from the next level of the storage hierarchy, is detected. If, at step S100, it is determined that no back snoop is detected, then flow proceeds to step S102 where the control circuitry awaits the return of a data item from the storage hierarchy and allocates the data item to the local storage circuitry in one of the ways that does not form part of the excluded subset of ways. If, at step S100, it was determined that there was a back snoop detected, then flow proceeds to step S106, where the control circuitry is configured to modify the state to suppress the restrictive access policy. Flow then proceeds to step S108 where the lookup in the local storage circuitry is replayed and the method set out in FIG. 9a is triggered but with the restrictive access policy now supressed.

FIG. 9c schematically illustrates an example sequence of steps carried out by the control circuitry when implementing the restrictive access policy according to step S97 of FIG. 9a. Flow begins at step S120 where the control circuitry triggers a lookup in the local storage circuitry that excludes (i.e., does not perform a lookup in) an excluded subset of ways. The lookup comprises reading both tag information and data information in each of the ways that are not part of the excluded subset to determine if any of the data information corresponds to the requested data. Flow then proceeds to step S122 where a lookup is performed in relation to the tag data in all ways of the local storage circuitry. The lookup in all ways of the local storage circuitry excludes performing a read of the data for each of the ways. Flow then proceeds to step S124 where it is determined if there was a hit in one of the non-excluded subset of ways. If, at step S124, it is determined that there was a hit in the non-excluded subset of ways, then flow proceeds to step S130 where the data item (that was already read out in step S120) is returned to the processing circuitry. If, at step S124, it was determined that there is not a hit in the non-excluded subset of ways then flow proceeds to step S126 where it is determined if the tag data (read out in step S122) from any of the ways indicates a hit in the local storage circuitry. If, at step S126, it is determined that there is a hit, then flow proceeds to step S132 where the state is modified to suppress the restrictive access policy. Flow then proceeds to step S134 where the lookup in the local storage circuitry is replayed, i.e., the method set out in FIG. 9a is triggered but with the restrictive access policy now supressed. If, at step S126, it was determined that there was no hit in any of the ways, then flow proceeds to step S128 where the control circuitry passes the lookup request to a next level of cache.

It would be readily apparent to the skilled person that one or more steps of the above flow diagrams may occur in a different order or in parallel to one another. For example, steps S120 and S122 may occur in a different order or in parallel to one another using the same lookup circuitry.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 10:
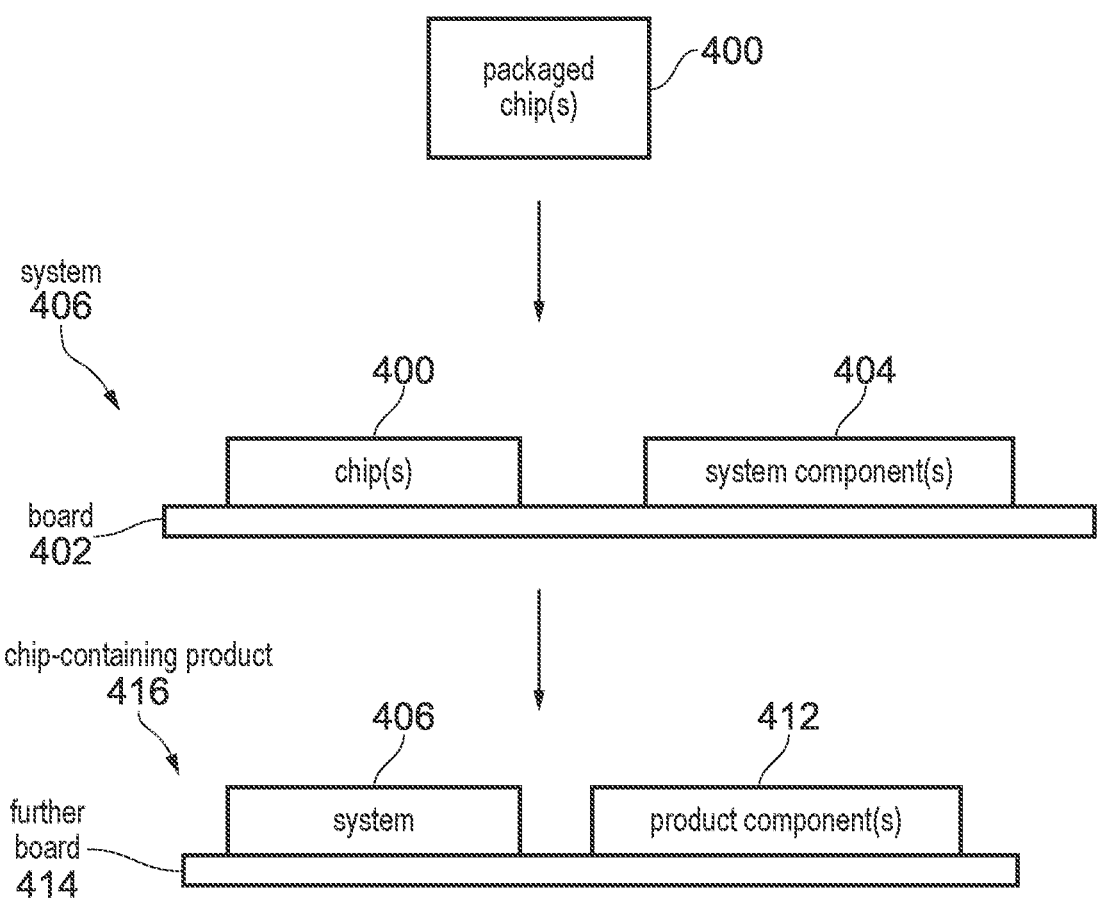
FIG. 10 schematically illustrates a system and chip-containing product according to some configurations of the present techniques.

As shown in FIG. 10, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In brief overall summary there is provided an apparatus, system, chip-containing product, method, and storage medium. The apparatus comprises memory access circuitry responsive to one or more types of memory access request, to retrieve specified data items from memory. The apparatus is also provided with local storage circuitry configured to store at least some of the retrieved data items. The local storage circuitry is N-way associative, and N is greater than 1. The apparatus is also provided with control circuitry responsive to an indication that an access request signalled to the local storage circuitry relating to an accessed data item corresponds to a predefined type of memory access, to implement a restrictive access policy in relation to the accessed data item in the local storage circuitry. The restrictive access policy excludes at least one step of accessing an excluded subset of ways of the local storage circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Configurations of the present techniques may also be described by the following clauses:

Clause 1. An apparatus comprising:
 memory access circuitry responsive to one or more types of memory access request, to retrieve data items specified in the one or more types of memory access request from memory;
 local storage circuitry configured to store at least some of the retrieved data items, wherein the local storage circuitry is N-way associative, and N is greater than 1; and
 control circuitry responsive to an indication that an access request signalled to the local storage circuitry relating to an accessed data item corresponds to a predefined type of memory access request, to implement a restrictive access policy in relation to the accessed data item in the local storage circuitry, wherein the restrictive access policy excludes at least one step of accessing an excluded subset of ways of the local storage circuitry.

Clause 2. The apparatus of clause 1, wherein the excluded subset comprises N minus 1 ways.

Clause 3. The apparatus of clause 1 or clause 2, wherein the accessed data item is associated with an address and the excluded subset is defined based on one or more bits of the address.

Clause 4. The apparatus of any preceding clause, wherein the access request comprises a lookup request specifying an address of the accessed data item for generating an index at which to perform a lookup in the local storage circuitry.

Clause 5. The apparatus of any preceding clause, wherein the access request comprises an allocation request for the accessed data item to be allocated to the local storage circuitry and an address of the accessed data item for generating an index at which to store the accessed data item in the local storage circuitry.

Clause 6. The apparatus of any preceding clause, wherein:
 the predefined type of memory access request is generated based on a predefined type of memory access instruction; and
 the apparatus comprises decoder circuitry responsive to receipt of the predefined type of memory access instruction to signal the indication to the control circuitry.

Clause 7. The apparatus of clause 6, wherein the predefined type of memory access instruction is any memory access instruction specifying a range of memory addresses meeting a predetermined condition.

Clause 8. The apparatus of clause 7, wherein the predetermined condition is satisfied when the range of memory addresses meets a size threshold.

Clause 9. The apparatus of clause 8, wherein the size threshold is a function of capacity of the local storage circuitry.

Clause 10. The apparatus of any of clauses 1 to 5, comprising storage monitoring circuitry configured to monitor accesses to the local storage circuitry, wherein the storage monitoring circuitry is configured to signal the indication to the control circuitry in response to a determination that accesses to the local storage circuitry structure meet an access condition.

Clause 11. The apparatus of clause 10, wherein the access condition is met when the accesses sequentially specify memory addresses forming a contiguous region of address space exceeding a predetermined size.

Clause 12. The apparatus of clause 10, wherein the access condition is met when the accesses sequentially specify memory addresses forming a strided access pattern comprising a predetermined number of accesses.

Clause 13. The apparatus of any preceding clause, wherein the control circuitry is responsive to a data presence indication indicating that one or more data items corresponding to the predefined type of memory access request are already stored in the excluded subset of ways to suppress the restrictive access policy.

Clause 14. The apparatus of clause 13, wherein the control circuitry is configured to suppress the restrictive access policy until a further condition is met.

Clause 15. The apparatus of clause 14, wherein the further condition comprises at least one of:
  a timing condition and the control circuitry comprises counter circuitry configured to store a count value indicative of a time subsequent to the data presence indication, the count value is reset in response to the data presence indication and the timing condition is met when the value exceeds a predetermined timing threshold;
  a confidence condition and the control circuitry is configured to monitor hits in the local storage circuitry to store information indicative of a hit rate of ways not included in the excluded subset of ways, and the confidence condition is satisfied when the information indicative of the hit rate meets a predetermined confidence threshold; and
  receipt of the indication in response to a further access request corresponding to the predefined type of memory access request.

Clause 16. The apparatus of any preceding clause, wherein the predefined memory access instruction is at least one of:
  a memory copy instruction specifying data to be copied from a first range of memory addresses to a second range of memory addresses;
  a memory move instruction specifying data to be moved from the first range of memory addresses to the second range of memory addresses; and
  a predefined type of vector load instruction.

Clause 17. The apparatus of any preceding claim, comprising prefetch generation circuitry to generate prefetch requests identifying prefetch data to be retrieved for storage in the local storage circuitry in anticipation of a demand request for the prefetch data, wherein:
  the prefetch generation circuitry is configured to determine whether the demand request for the prefetch data is anticipated to correspond to the predefined type of memory access request based on comparison of a pattern of prefetch requests to a predefined access pattern and, when the prefetch data is anticipated to correspond to the predefined type of memory access request, to trigger the control circuitry to implement the restrictive access policy when allocating the prefetch data to the local storage circuitry.

Clause 18. The apparatus of any clause 17, wherein the control circuitry is configured:
  to apply the restrictive access policy independently to prefetch requests and demand requests;
  prior to implementing the restrictive access policy in relation to the demand requests and in response to the indication, to monitor hits in the local storage circuitry to determine whether a hit rate of ways not included in the excluded subset of ways satisfies a predetermined confidence condition;
  when the predetermined confidence condition is met, to implement the restrictive access policy; and
  when the predetermined confidence condition is not met, to defer implementing the restrictive access policy.

Clause 19. The apparatus of any preceding clause, wherein:
  the local storage circuitry is configured to store each retrieved data item in association with tag data indicating an address associated with that retrieved data item;
  the at least one step of accessing the excluded subset of ways comprises accessing the retrieved data item of the excluded subset of ways; and
  the control circuitry is configured to read information indicative of the tag data for all ways of the local storage circuitry and, in response to a determination that the restrictive access policy misses in the local storage circuitry and that the information indicative of the tag data indicates a hit in a different way of the local storage circuitry, to suppress the restrictive access policy and to access the retrieved data item based on the information indicative of the tag data.

Clause 20. The apparatus of any of clauses 1 to 18, wherein:
  the apparatus comprises micro-tag storage arranged to store information indicative of the tag data for all ways of the local storage circuitry;
  the at least one step of accessing the excluded subset of ways comprises reading information from the excluded subset of ways;
  the control circuitry is configured to read the information indicative of the tag data for all ways of the local storage circuitry from the micro-tag storage in parallel to performing a lookup in the local storage circuitry excluding the restricted subset of ways; and
  in response to a determination that the restrictive access policy misses in the local storage circuitry and that the information indicative of the tag data indicates a hit in a different way of the local storage circuitry, to suppress the restrictive access policy and to replay the lookup.

Clause 21. A system comprising:
  the apparatus of any preceding clause, implemented in at least one packaged chip;
  at least one system component; and
  a board,
  wherein the at least one packaged chip and the at least one system component are assembled on the board.

Clause 22. A chip-containing product comprising the system of clause 21 assembled on a further board with at least one other product component.

Clause 23. A non-transitory computer readable storage medium to store computer-readable code for fabrication of an apparatus according to any preceding clause.

I claim:

1. An apparatus comprising:
   memory access circuitry responsive to one or more types of memory access request, to retrieve data items specified in the one or more types of memory access request from memory;
   local storage circuitry configured to store at least some of the retrieved data items, wherein the local storage circuitry is N-way associative, and N is greater than 1; and
   control circuitry responsive to an indication that an access request signalled to the local storage circuitry relating to an accessed data item corresponds to a predefined type of memory access request, to implement a restrictive access policy in relation to the accessed data item in the local storage circuitry, wherein the restrictive access policy excludes at least one step of accessing an excluded subset of ways of the local storage circuitry, wherein:
   the predefined type of memory access request is generated based on a predefined type of memory access instruction; and
   the apparatus comprises decoder circuitry responsive to receipt of the predefined type of memory access instruction to signal the indication to the control circuitry.

2. The apparatus of claim 1, wherein the accessed data item is associated with an address and the excluded subset is defined based on one or more bits of the address.

3. The apparatus of claim 1, wherein the access request comprises a lookup request specifying an address of the accessed data item for generating an index at which to perform a lookup in the local storage circuitry.

4. The apparatus of claim 1, wherein the access request comprises an allocation request for the accessed data item to be allocated to the local storage circuitry and an address of the accessed data item for generating an index at which to store the accessed data item in the local storage circuitry.

5. The apparatus of claim 1, wherein the predefined type of memory access instruction is any memory access instruction specifying a range of memory addresses meeting a predetermined condition.

6. The apparatus of claim 5, wherein the predetermined condition is satisfied when the range of memory addresses meets a size threshold.

7. The apparatus of claim 1, wherein the control circuitry is responsive to a data presence indication indicating that one or more data items corresponding to the predefined type of memory access request are already stored in the excluded subset of ways to suppress the restrictive access policy.

8. The apparatus of claim 7, wherein the control circuitry is configured to suppress the restrictive access policy until a further condition is met.

9. The apparatus of claim 8, wherein the further condition comprises at least one of:
   a timing condition and the control circuitry comprises counter circuitry configured to store a count value indicative of a time subsequent to the data presence indication, the count value is reset in response to the data presence indication and the timing condition is met when the value exceeds a predetermined timing threshold;
   a confidence condition and the control circuitry is configured to monitor hits in the local storage circuitry to store information indicative of a hit rate of ways not included in the excluded subset of ways, and the confidence condition is satisfied when the information indicative of the hit rate meets a predetermined confidence threshold; and
   receipt of the indication in response to a further access request corresponding to the predefined type of memory access request.

10. The apparatus of claim 1, wherein:
    the local storage circuitry is configured to store each retrieved data item in association with tag data indicating an address associated with that retrieved data item;
    the at least one step of accessing the excluded subset of ways comprises accessing the retrieved data item of the excluded subset of ways; and
    the control circuitry is configured to read information indicative of the tag data for all ways of the local storage circuitry and, in response to a determination that the restrictive access policy misses in the local storage circuitry and that the information indicative of the tag data indicates a hit in a different way of the local storage circuitry, to suppress the restrictive access policy and to access the retrieved data item based on the information indicative of the tag data.

11. The apparatus of claim 1, wherein:
    the apparatus comprises micro-tag storage arranged to store information indicative of the tag data for all ways of the local storage circuitry;
    the at least one step of accessing the excluded subset of ways comprises reading information from the excluded subset of ways;
    the control circuitry is configured to read the information indicative of the tag data for all ways of the local storage circuitry from the micro-tag storage in parallel to performing a lookup in the local storage circuitry excluding the restricted subset of ways; and
    in response to a determination that the restrictive access policy misses in the local storage circuitry and that the information indicative of the tag data indicates a hit in a different way of the local storage circuitry, to suppress the restrictive access policy and to replay the lookup.

12. The apparatus of claim 1, comprising prefetch generation circuitry to generate prefetch requests identifying prefetch data to be retrieved for storage in the local storage circuitry in anticipation of a demand request for the prefetch data,
    wherein the prefetch generation circuitry is configured to determine whether the demand request for the prefetch data is anticipated to correspond to the predefined type of memory access request based on comparison of a pattern of prefetch requests to a predefined access pattern and, when the prefetch data is anticipated to correspond to the predefined type of memory access request, to trigger the control circuitry to implement the restrictive access policy when allocating the prefetch data to the local storage circuitry.

13. The apparatus of claim 12, wherein the control circuitry is configured:
    to apply the restrictive access policy independently to prefetch requests and demand requests;
    prior to implementing the restrictive access policy in relation to the demand requests and in response to the indication, to monitor hits in the local storage circuitry to determine whether a hit rate of ways not included in the excluded subset of ways satisfies a predetermined confidence condition;

when the predetermined confidence condition is met, to implement the restrictive access policy; and when the predetermined confidence condition is not met, to defer implementing the restrictive access policy.

14. A system comprising:
the apparatus of claim 1, implemented in at least one packaged chip;
at least one system component; and
a board,
wherein the at least one packaged chip and the at least one system component are assembled on the board.

15. A chip-containing product comprising the system of claim 14 assembled on a further board with at least one other product component.

16. A non-transitory computer readable storage medium to store computer-readable code for fabrication of the apparatus according to claim 1.

17. An apparatus, comprising:
memory access circuitry responsive to one or more types of memory access request, to retrieve data items specified in the one or more types of memory access request from memory;
local storage circuitry configured to store at least some of the retrieved data items, wherein the local storage circuitry is N-way associative, and N is greater than 1;
control circuitry responsive to an indication that an access request signalled to the local storage circuitry relating to an accessed data item corresponds to a predefined type of memory access request, to implement a restrictive access policy in relation to the accessed data item in the local storage circuitry, wherein the restrictive access policy excludes at least one step of accessing an excluded subset of ways of the local storage circuitry; and
storage monitoring circuitry configured to monitor accesses to the local storage circuitry, wherein the storage monitoring circuitry is configured to signal the indication to the control circuitry in response to a determination that accesses to the local storage circuitry sequentially specify memory addresses forming at least one of:
a contiguous region of address space exceeding a predetermined size; and
a strided access pattern comprising a predetermined number of accesses.

18. A non-transitory computer readable storage medium to store computer-readable code for fabrication of the apparatus according to claim 17.

19. A method of operating an apparatus, the method comprising:
in response to one or more types of memory access request, retrieving data items specified in the one or more types of memory access request from memory;
storing at least some of the retrieved data items in local storage circuitry, wherein the local storage circuitry is N-way associative, and N is greater than 1; and
in response to an indication that an access request signalled to the local storage circuitry relating to an accessed data item corresponds to a predefined type of memory access request, implementing a restrictive access policy in relation to the accessed data item in the local storage circuitry, wherein the restrictive access policy excludes at least one step of accessing an excluded subset of ways of the local storage circuitry, wherein:
the predefined type of memory access request is generated based on a predefined type of memory access instruction; and
the method further comprises signalling the indication in response to receipt of the predefined type of memory access instruction.

* * * * *